(12) United States Patent
Oshima

(10) Patent No.: US 8,885,090 B2
(45) Date of Patent: Nov. 11, 2014

(54) IMAGING APPARATUS AND AUTOFOCUS CONTROL METHOD THEREOF

(71) Applicant: FUJIFILM Corporation, Tokyo (JP)

(72) Inventor: Hiroyuki Oshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/040,243

(22) Filed: Sep. 27, 2013

(65) Prior Publication Data

US 2014/0028896 A1 Jan. 30, 2014

Related U.S. Application Data

(63) Continuation of application No. PCT/JP2012/057963, filed on Mar. 27, 2012.

(30) Foreign Application Priority Data

Mar. 30, 2011 (JP) .................................. 2011-076344

(51) Int. Cl.
*G03B 13/00* (2006.01)
*H04N 5/232* (2006.01)
*G03B 13/36* (2006.01)

(52) U.S. Cl.
CPC ................. *H04N 5/23212* (2013.01); *G03B 13/36* (2013.01)
USPC ......................................... 348/350; 348/345

(58) Field of Classification Search
CPC ................................................. H04N 5/23212
USPC ................................................ 348/345–356
See application file for complete search history.

(56) References Cited

U.S. PATENT DOCUMENTS

| 2007/0269127 | A1* | 11/2007 | Kusaka .......................... 382/255 |
| 2008/0118238 | A1 | 5/2008 | Sogawa et al. |
| 2010/0073527 | A1 | 3/2010 | Ichimiya |
| 2010/0194967 | A1 | 8/2010 | Amano |
| 2011/0096211 | A1 | 4/2011 | Oikawa et al. |

FOREIGN PATENT DOCUMENTS

| JP | 2007-310043 A | 11/2007 |
| JP | 2008-129174 A | 6/2008 |
| JP | 2009-69577 A | 4/2009 |
| JP | 2009-105358 A | 5/2009 |
| JP | 2009-271428 A | 11/2009 |
| JP | 2010-14981 A | 1/2010 |
| JP | 2010-20016 A | 1/2010 |
| JP | 2010-78856 A | 4/2010 |
| JP | 2010-204294 A | 9/2010 |

* cited by examiner

*Primary Examiner* — Sinh Tran
*Assistant Examiner* — Christopher K Peterson
(74) *Attorney, Agent, or Firm* — Birch, Stewart, Kolasch & Birch, LLP

(57) ABSTRACT

In an imaging apparatus having a solid-state imaging device in which a focus detection pixel (phase difference detection pixel) is mounted on a light receiving surface, when dust is attached on the light receiving surface, a phase difference amount in a dust presence region is calculated from a detection signal of a phase difference detection signal and reliability of the phase difference amount is determined and when the reliability is high, phase difference AF control is performed with the phase difference amount calculated in the dust presence region.

22 Claims, 19 Drawing Sheets

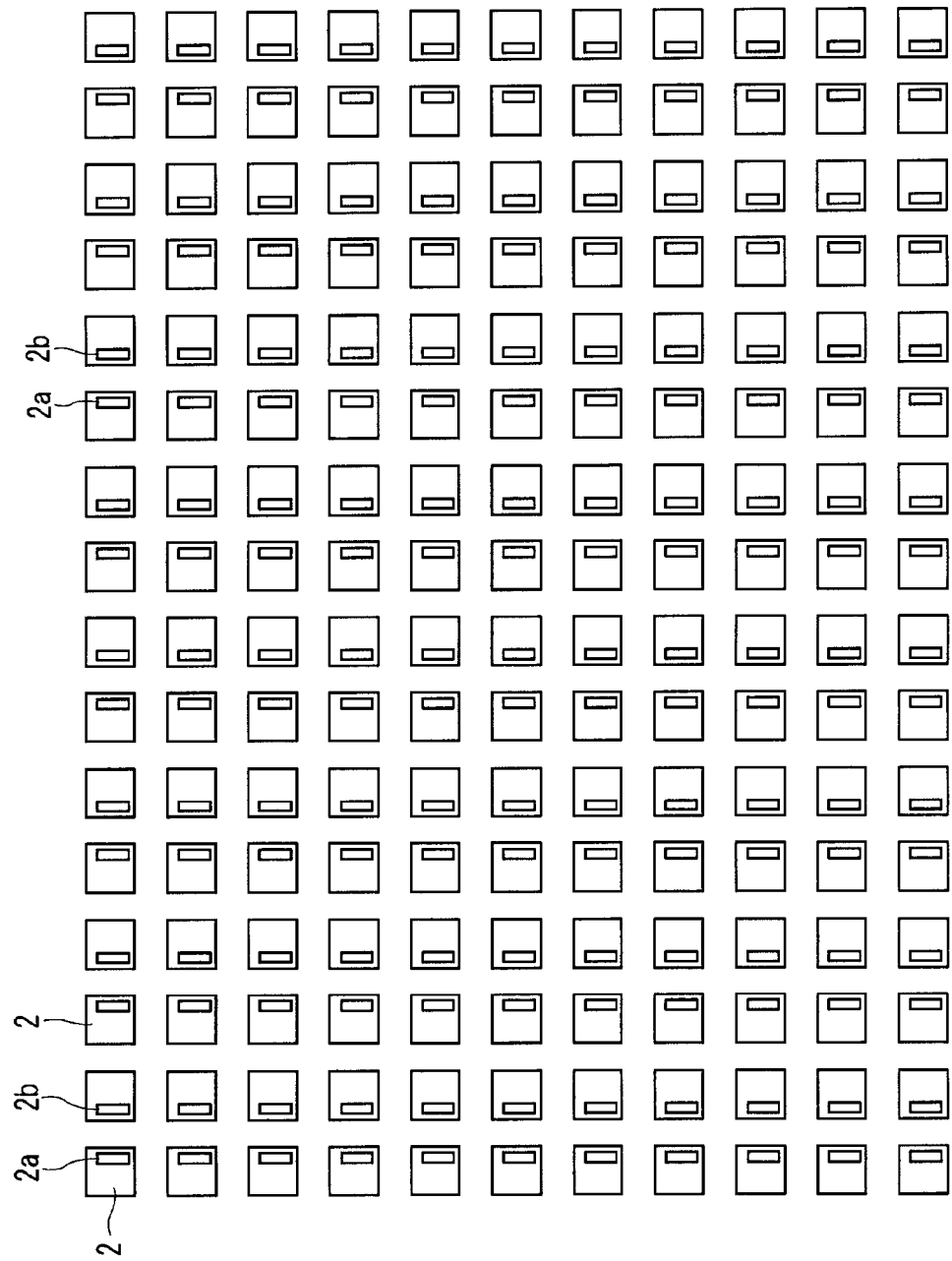

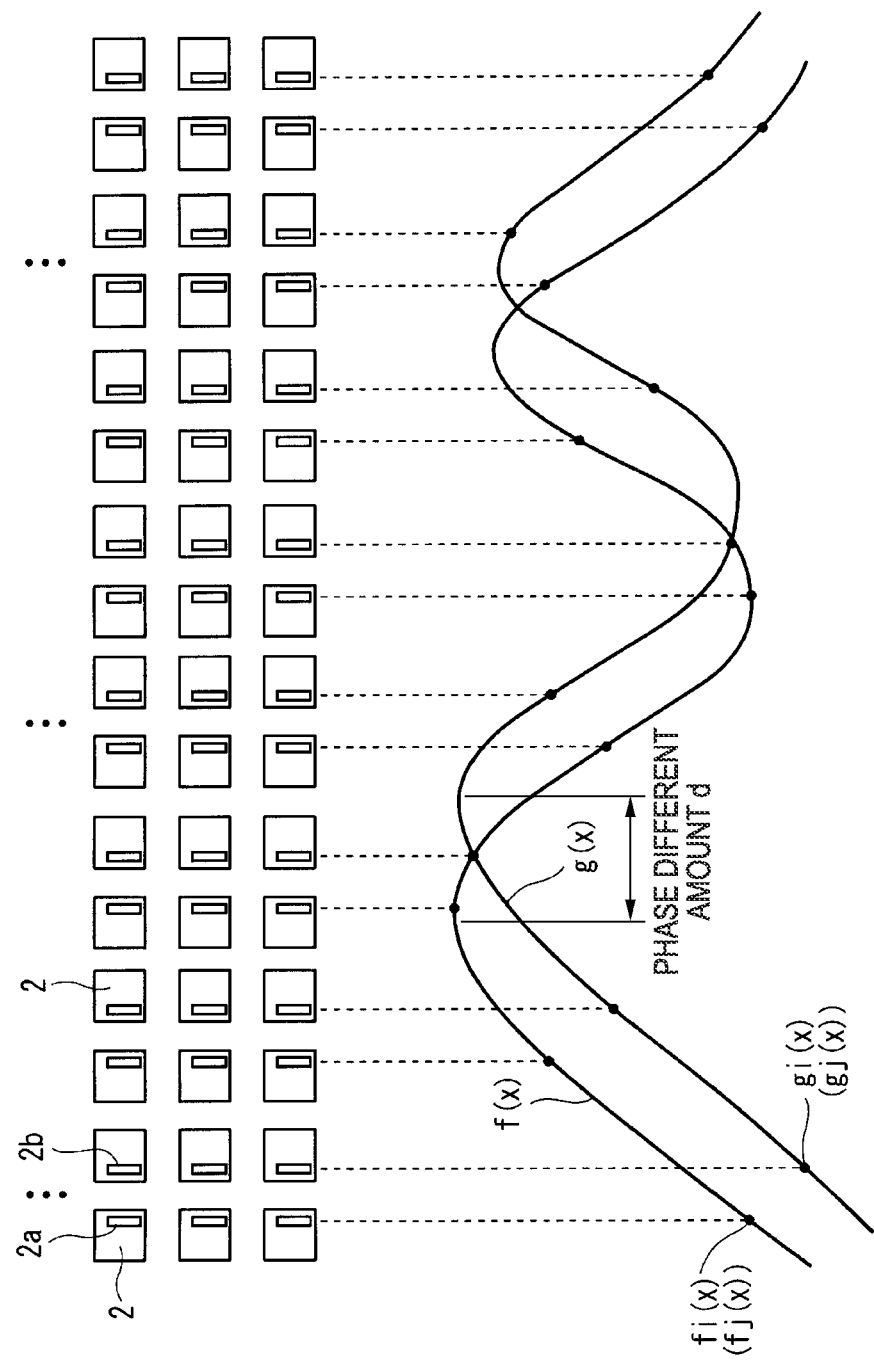

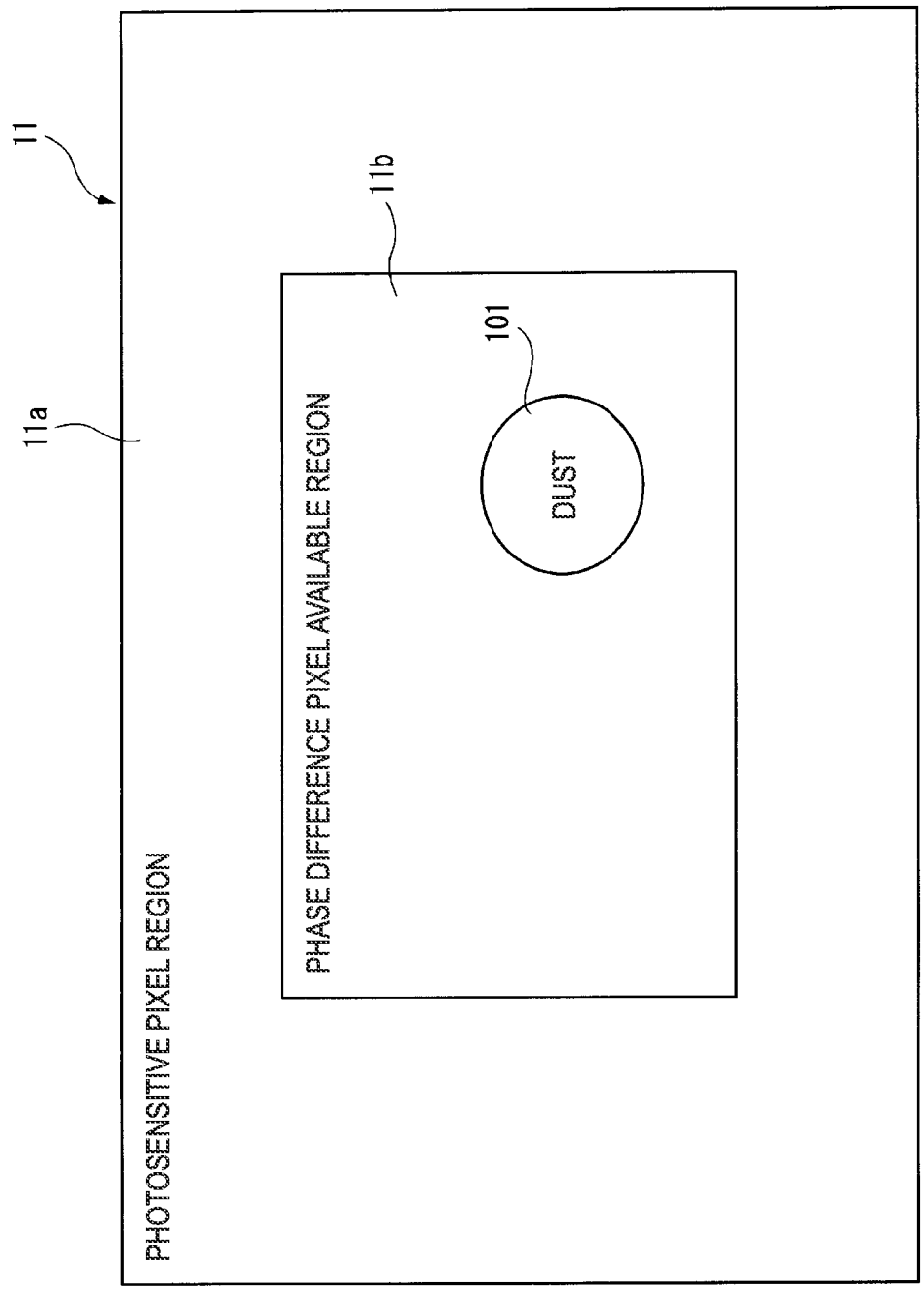

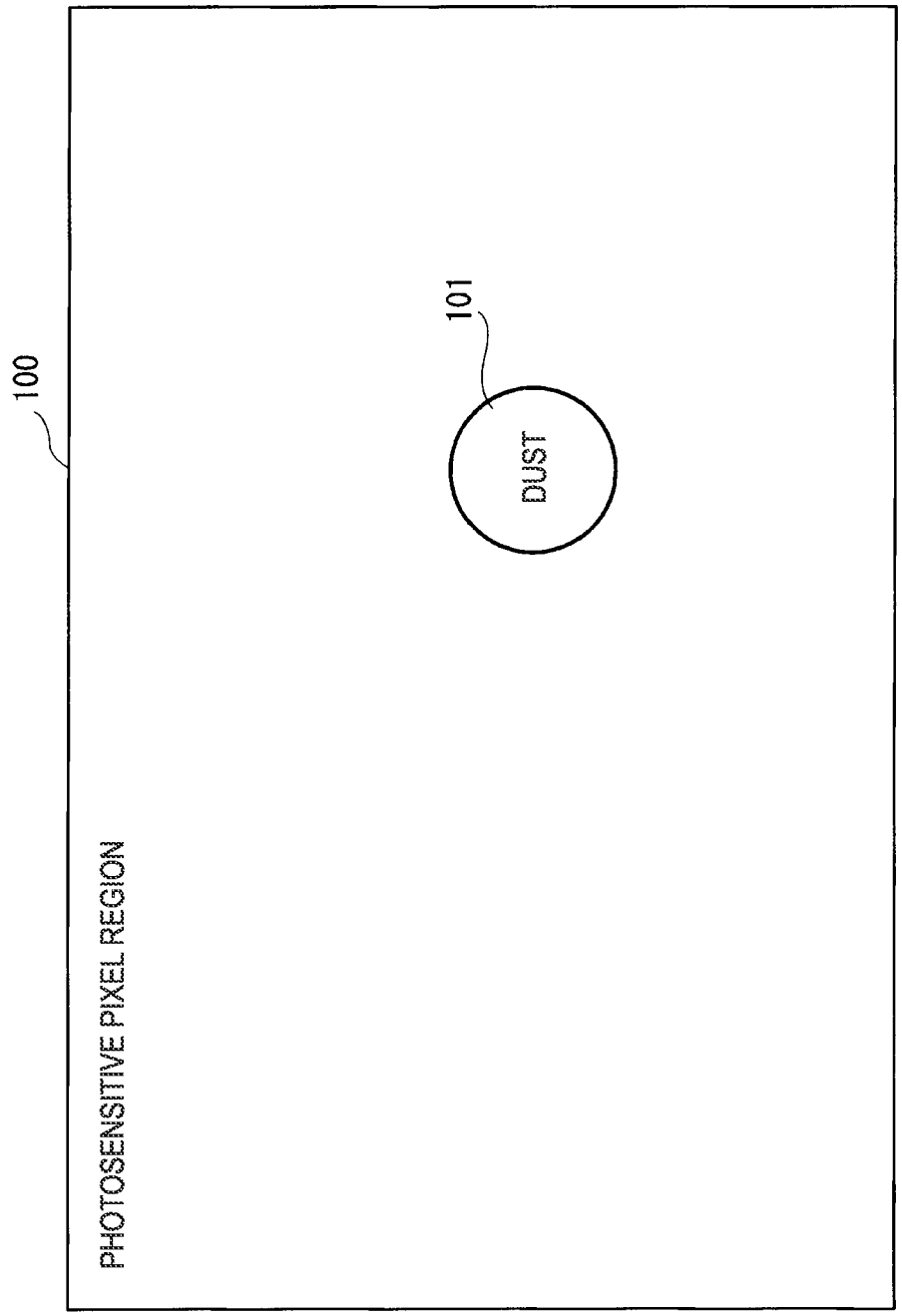

IMAGING APPARATUS AND AUTOFOCUS CONTROL METHOD THEREOF

CROSS REFERENCE TO RELATED APPLICATION

This is a continuation of International Application No. PCT/JP2012/057963 filed on Mar. 27, 2012, and claims priority from Japanese Patent Application No. 2011-076344, filed on Mar. 30, 2011, the entire disclosures of which are incorporated herein by reference.

TECHNICAL FIELD

The present invention relates to an imaging apparatus such as a digital camera with a solid-state imaging device having a focus detection pixel (also referred to as a phase difference detection pixel) and an autofocus control method thereof, and more particularly, to an imaging apparatus that calculates a focus distance up to a subject based on phase difference information output from a phase difference detection pixel and an autofocus control method thereof.

BACKGROUND ART

In a camera system, for example, as illustrated in FIG. 19, dust 101 may be attached on a light receiving surface 100 (actually on an optical low pass filter since the optical low pass filter is disposed on a front surface of a photosensitive pixel region which is the light receiving surface of a solid-state imaging device) of the solid-state imaging device. The dust may be removed by vibrating the optical low pass filter depending on a model of a camera, but dust having a high adherence property is hardly detached. In this case, a partial region on which the dust is attached is shown as a sensitivity reduction region in a subject image captured by the solid-state imaging device.

Patent Literature 1 discloses a technology that specifies a region where the dust 101 is present and detects a focus using a captured image signal of a region other than the region where the dust is present. Further, Patent Literature 2 discloses a technology that divides a plurality of focus detection regions of the surface of an AF sensor provided separately from the solid-state imaging device into a plurality of blocks, respectively, and nullifies an output of a focus amount detecting unit in a block in which it is determined that the dust is present by a dust presence or absence determination unit. In such a case, when a main subject is reflected in the region where the dust is present, the main subject cannot be focused.

In recent years, burying a phase difference detection pixel on the light receiving surface of the solid-state imaging device started to be distributed. The phase difference detection pixel may be configured, for example, by pupil-dividing two adjacent pixels. For example, as disclosed in Patent Literature 3 below, a light shielding film opening has a smaller area than another general pixel and further, light shielding film openings of two adjacent pixels (pair pixels) are configured to be eccentric in opposite directions.

Even in the solid-state imaging device having the phase difference detection pixel, when the dust is attached on the light receiving surface of the solid-state imaging device, accurate phase difference information cannot be obtained, and as a result, precision of an autofocus (AF) deteriorates. In particular, when a main subject image moves to the dust presence region, an image in which the main subject is focused cannot be captured.

CITATION LIST

Patent Literature

Patent Literature 1: JP-A-2010-14981
Patent Literature 2: JP-A-2009-271428
Patent Literature 3: JP-A-2009-105358

SUMMARY OF INVENTION

Technical Problem

An object of the present invention is to provide an imaging apparatus capable of capturing an image in which a main subject is focused even though a dust image moves to a location overlapping with a main subject image on a light receiving surface of a solid-state imaging device having a phase difference detection pixel, and an autofocus control method thereof.

Solution to Problem

It is an imaging apparatus, comprising: a solid-state imaging device which is provided, on a light receiving surface, with a plurality of sets of first and second phase difference detection pixels each set of the first and second phase difference detection pixels are adjacent to each other and pupil-divided; a dust presence or absence determination unit that determines whether a dust image is present or not in an image captured in an AF region of the light receiving surface; a focus deviation amount calculating unit that calculates a deviation amount between a detection signal of the first phase difference detection pixel and a detection signal of the second phase difference detection pixel overlapping with the dust image when the dust image is included in the AF region; a deviation amount reliability determination unit that judges reliability of the deviation amount; and a control unit that performs an autofocus control by a phase difference AF method using the deviation amount when the reliability of the deviation amount is high and performs an autofocus control by a method other than the phase difference AF method using the deviation amount when the reliability is low.

It is an autofocus control method of an imaging apparatus mounted with a solid-state imaging device which is provided, on a light receiving surface, with a plurality of sets of first and second phase difference detection pixels each set of the first and second phase difference detection pixels are adjacent to each other and pupil-divided, comprising; determining whether a dust image is present or not in an image captured in an AF region of the light receiving surface; calculating a deviation amount between a detection signal of the first phase difference detection pixel and a detection signal of the second phase difference detection pixel overlapping with the dust image when the dust image is included in the AF region; judging reliability of the deviation amount; and performing an autofocus control by a phase difference AF method using the deviation amount when the reliability of the deviation amount is high and performs an autofocus control by a method other than the phase difference AF method using the deviation amount when the reliability is low.

Advantageous Effects of Invention

According to the present invention, even if a dust image is positioned on a light receiving surface of a solid-state imaging device having a phase difference detection pixel and at a location overlapping with a main subject image, an image in which a main subject is focused can be captured.

BRIEF DESCRIPTION OF DRAWINGS

FIG. 4 is a surface schematic view of a solid-state imaging device which replaces FIGS. 2 and 3.

FIG. 5 is a diagram describing a detection principle of the phase difference information by the phase difference detection pixel.

FIG. 6 is a diagram illustrating a state in which dust is attached to a phase difference detection pixel available region.

FIG. 19 is a view illustrating a state in which dust is attached on a light receiving surface of a solid-state imaging device.

DESCRIPTION OF EMBODIMENTS

Hereinafter, exemplary embodiments of the present invention will be described with reference to the accompanying drawings.

Figure 1:
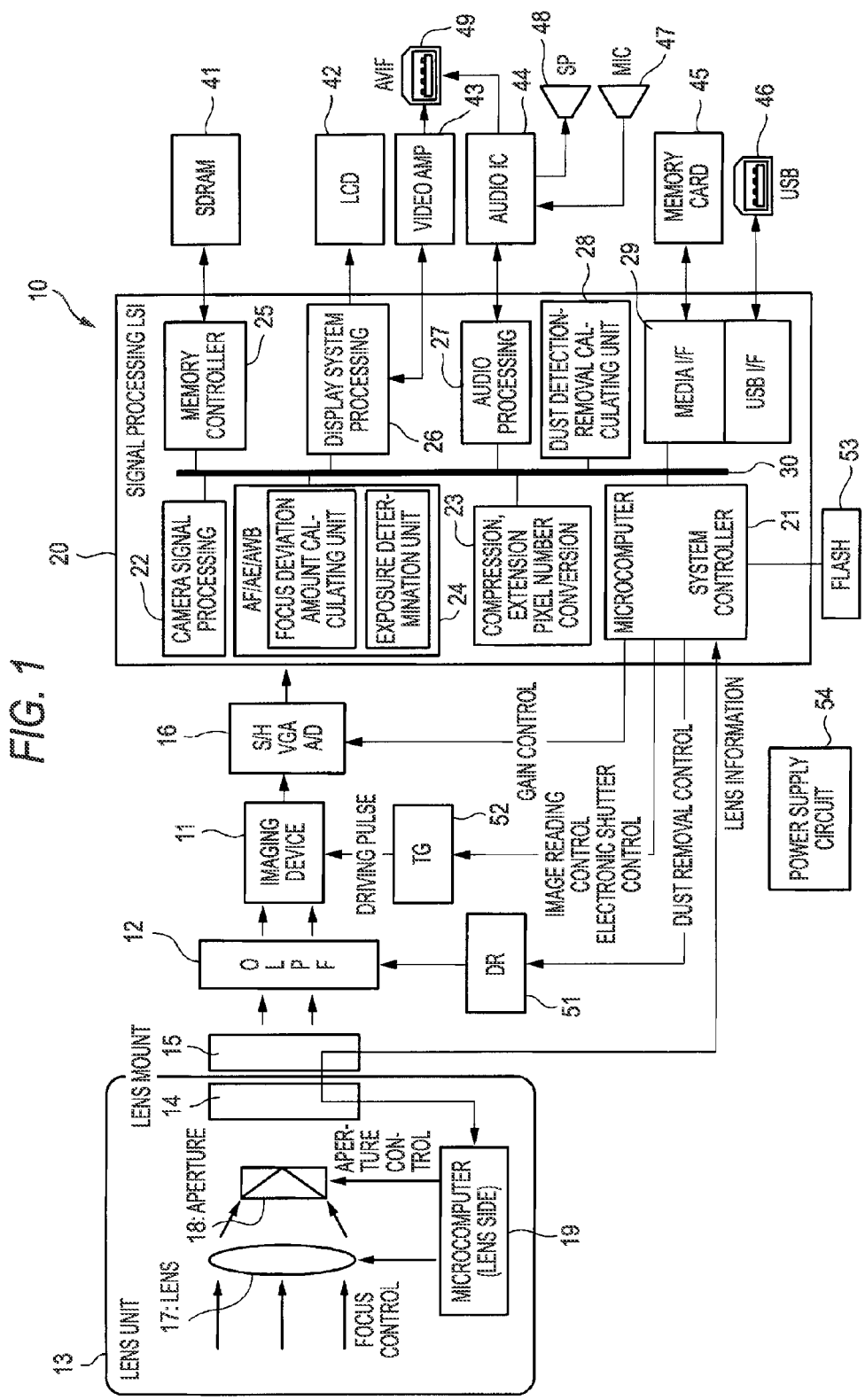
FIG. 1 is a functional block diagram of an imaging apparatus according to an exemplary embodiment of the present invention.

FIG. 1 is a functional block diagram of an imaging apparatus (digital camera) according to an exemplary embodiment of the present invention. An imaging apparatus 10 includes a solid-state imaging device 11 such as a CCD type or a CMOS, an optical low pass filter (OLPF) 12 disposed on a front surface of the solid-state imaging device 11, and a lens unit 13 disposed at a front stage of the optical low pass filter 12. Further, an infrared cut filter is arranged in parallel to the optical low pass filter 12, but the illustration is omitted.

The lens unit 13 is adapted to be exchangeable with another lens unit which is not illustrated by detachably coupling a lens mount 14 in the lens unit and a lens mount 15 at a camera body.

The lens unit 13 is provided with a photographing lens 17 having a zoom lens or a focus lens, an aperture 18 disposed at the rear of the photographing lens 17, and a microcomputer 19 controlling a magnification of the photographing lens 17 or controlling a focus location according to an instruction of a system controller 21 to be described below.

The imaging apparatus 10 further includes an analog signal processing unit 16 that processes an analog captured image signal (e.g., a correlation dual sampling processing, a gain control processing, and analog-digital conversion processing) output from the solid-state imaging device 11 and a signal processing LSI 20 performing various image processings by receiving an output signal of the analog signal processing unit 16.

The signal processing LSI 20 includes a system controller (microcomputer) 21 the integrally controls the entirety of the imaging apparatus 10, a camera signal processing unit 22 that performs various image processing for a captured image signal received thereto, a compression and extension processing unit 23 that performs, for example, compressing, extending, or pixel number conversion processing of image-processed image data, and an AF/AE/AWB processing unit 24 that performs, for example, an autofocus (AF) processing, an automatic exposure (AE) processing, and an automatic white balance (AWB) processing, by processing through image data output from the solid-state imaging device 11 and determining exposure while calculating a focus deviation amount to be described below.

The signal processing LSI 20 further includes a memory controller 25 connected to an SDRAM 41 used as a main memory, a display system processing unit 26 connected to a display unit 42 or a video amplifier 43 provided on a rear surface of the camera, an audio processing unit 27 connected to an audio IC 44, a dust detection and removal calculating unit 28, and an interface unit 29 having a memory interface connected to a memory card 45 having captured image data recorded therein or a USB interface connected to a USB terminal 46.

The respective components (the system controller 21 to the interface unit 29) of the signal processing LSI 20 are connected each other by a bus 30. A microphone 47 or a speaker 48 is connected to an audio IC 44 and an AF interface 49 is connected to the video amplifier 43 and the audio IC 44.

The system controller 21 communicates with a microcomputer 19 in the lens unit 13 to acquire lens information while performing a focus control or aperture control. Further, the system controller 21 supplies a driving pulse to the solid-state imaging device 11 through a timing generator (TG) 52 while controlling dust removal by performing a minute vibration control of the optical low pass filter 12 through a driver (DR) 51. Further, the system controller 21 controls light emission of a flash 53 provided at a required location on a front surface of the camera. A power supply circuit 54 is provided in the imaging apparatus 10 to supply power to the above-described respective components.

Figure 2:
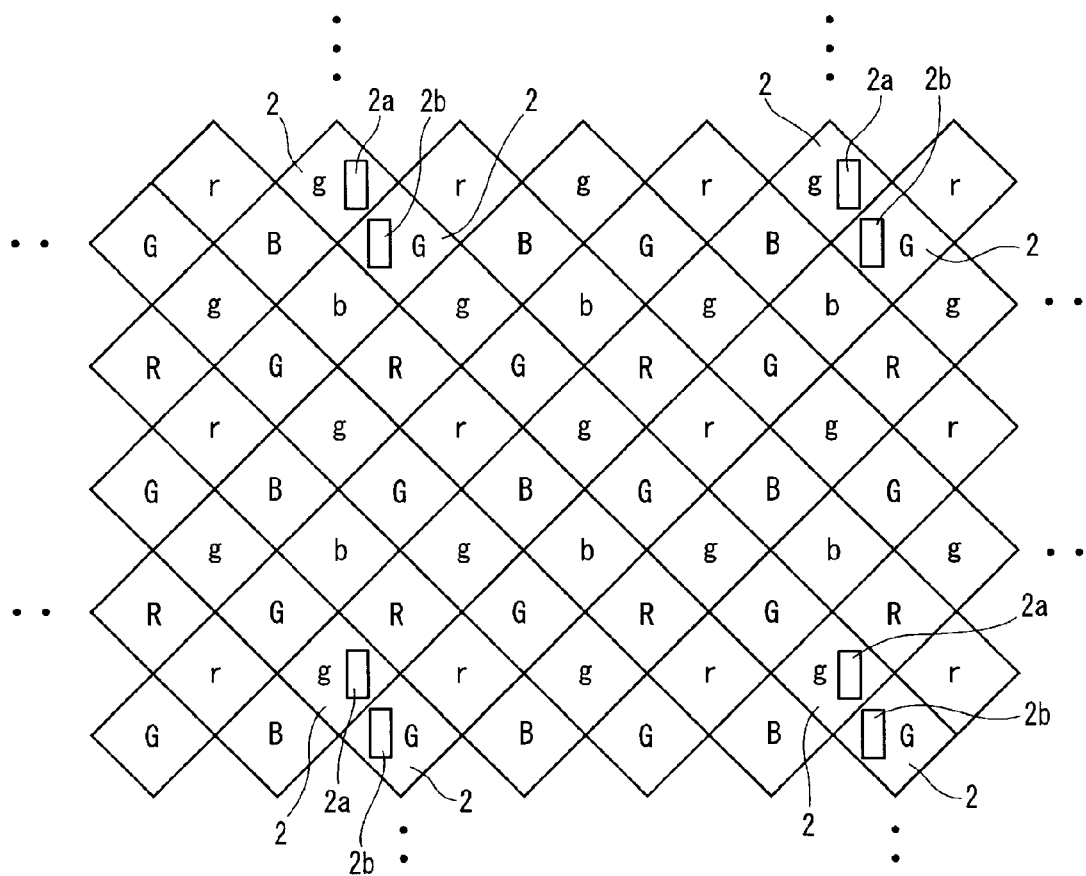
FIG. 2 is a surface schematic view of the solid-state imaging device 11 illustrated in FIG. 1.

FIG. 2 is a view illustrating examples of a pixel array and a color filter array of the solid-state imaging device 11 illustrated in FIG. 1. The square frames which are tilted at 45° represents respective pixels (photoelectric conversion devices: photodiodes) and R (=r), G (=g), and B (=b) marked thereon represent colors of color filters.

The solid-state imaging device 11 of the illustrated example is configured in a so-called honeycomb pixel array in which even-numbered pixel rows are disposed to be offset by a ½ pixel pitch in relation to odd-numbered pixel rows, respectively. Considering only the pixels of the odd-numbered rows, they are arrayed in a square lattice array, the color filters rgb are Bayer-arrayed thereon and only pixels of the even-numbered row are arrayed in the square lattice and the color filters RGB are Bayer-arrayed thereon.

Light shielding film openings 2a and 2b of adjacent pixels in which one pixel and a green (G and g) color filter is stacked on four pixels in both a horizontal direction and a vertical direction are provided to be smaller than a light shielding film opening (not illustrated) of another typical pixel and be eccentric in opposite directions to each other to pupil-dividing the pixel. A pixel having such a light shielding film opening 2a constitutes a first phase difference detection pixel (focus detection pixel) 2 and a pixel having a light shielding film opening 2b constitutes a second phase difference detection pixel 2 that forms a pair. Further, in this example, the light shielding film openings of two adjacent pixels are eccentric to be pupil-divided. However, one common oval micro lens may be mounted on two adjacent pixels to pupil-divide the pixel.

Figure 3:
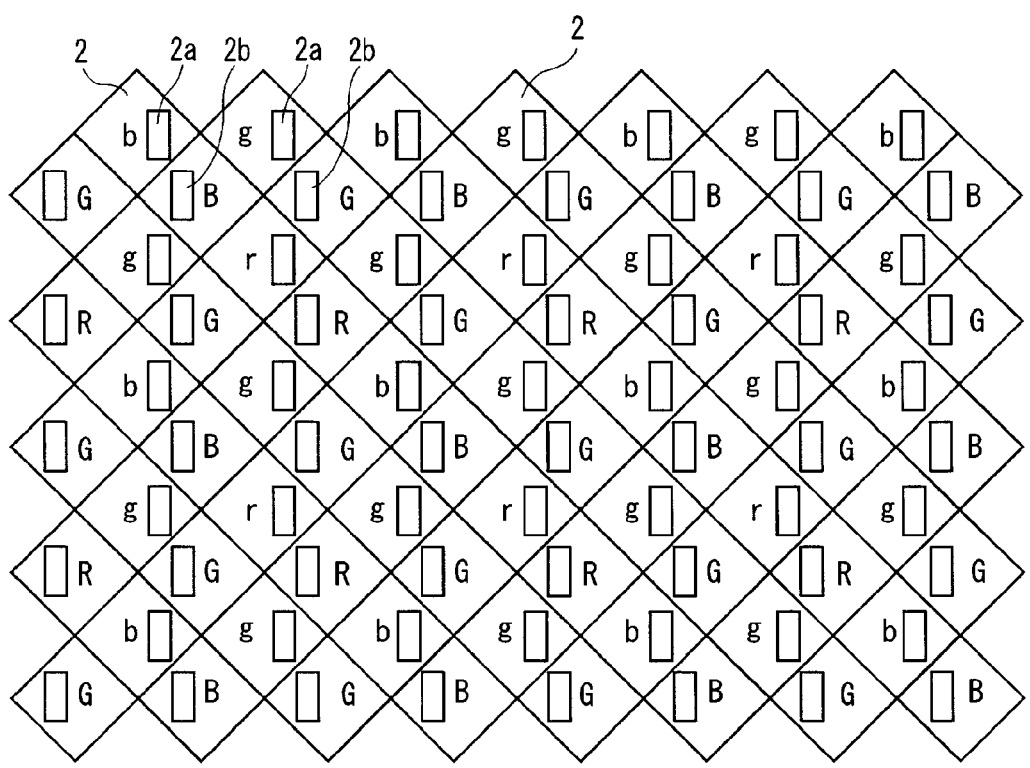
FIG. 3 is a surface schematic view of a solid-state imaging device which replaces FIG. 2.

FIG. 3 is a surface schematic view of a solid-state imaging device according to another exemplary embodiment. The pixel array and the color filter array are the same as those of the exemplary embodiment of FIG. 2, but the exemplary embodiment is different from the exemplary embodiment of FIG. 2 in that all pixels are set as the phase difference detection pixel 2 and the light shielding film openings 2a and 2b that are eccentric are provided in two adjacent pixels that form a pair, respectively.

In the exemplary embodiment of FIG. 2, the phase difference detection pixel detects only phase difference information and a captured image signal at a location of the phase difference detection pixel is calculated by interpolation-calculating a captured image signal of the general surrounding same-color color, but in the exemplary embodiment, all the pixels detect phase difference information and generate a subject capture image using detection signals of all the pixels as the captured image signals.

FIG. 4 is a surface schematic view of a solid-state imaging device according to yet another exemplary embodiment. The pixels arrays in the exemplary embodiments of FIGS. 2 and 3 are the so-called pixel honeycomb array, but in the exemplary embodiment, the pixel array is the square lattice array. In addition, the light shielding film openings 2a and 2b which are eccentric are provided in two same-color pixels adjacent in the horizontal direction, respectively, which form a pair by using all of the pixels as the phase difference detection pixel. Of course, even when the pixel array is the square lattice array, the phase difference detection pixel may be provided at a discrete location (and/or a periodic location) like the exemplary embodiment of FIG. 2.

In the exemplary embodiments of FIGS. 2 to 4, a phase detection pixel is provided in all the pixels or the discrete pixels of the entire region of the light receiving surface (photosensitive pixel region) of the solid-state imaging device. However, the phase difference detection pixel may be provided only at the central region of the light receiving surface. This is because the phase difference information is information required when an AF processing is performed and there is a high probability that a main subject will enter the central region.

FIG. 5 is a view describing a detection principle of the phase difference information detected by the phase difference detection pixel. When an output signal f(x) of the first phase difference detection pixel having the light shielding film opening 2a and an output signal g(x) of the second phase difference detection pixel having the light shielding film opening 2b are plotted while moving a focus location of a photographing lens, a result of FIG. 5 is achieved. Herein, x represents a horizontal-direction (lateral-direction) location. As values of f(x) and g(x) are larger, the focus is adjusted. In the case of FIG. 5, f(x) and g(x) are accurately focused at a portion which deviates by a phase difference amount d. The phase difference amount d corresponds to a focus deviation amount to become a function of a distance up to a subject.

In the case of the focus deviation amount, when S(d)=∫|f(x+d)−g(x)|dx is defined, d in which S(d) is minimized may be calculated.

After the focus deviation amount is calculated, the focus deviation amount is converted into an AF parameter such as a driving pulse number of a focus lens (a conversion table is stored in a storage region of the imaging apparatus) to perform AF control.

In the phase difference AF control, since a high-speed processing is available as compared with a contrast AF method, there is low concern that a shutter chance will be lost. However, in order to set AF precision to high precision, the f(x) and the g(x) may be preferably calculated by adding and averaging detection signals of a plurality of phase difference detection pixels that are arranged in the vertical direction (longitudinal direction) of the solid-state imaging device. When the vertical addition number may not be secured, there is a high possibility that the AF precision cannot be expected.

FIG. 6 is a diagram illustrating a state in which dust is attached onto the light receiving surface (optical low pass filter surface) of the solid-state imaging device. FIG. 6 illustrates a state in which dust 101 is attached in a center region of a light receiving surface (photosensitive pixel region) 11a of a solid-state imaging device 11. The phase difference detection pixel 2 described in FIGS. 2 to 5 is provided in the central region, which becomes a phase difference pixel available region 11b.

When an image of a subject (for example, a person) is captured by an imaging apparatus 10, an image of a main subject part (for example, a face) enters the region to which the dust 101 is attached. A photographer naturally intends to capture an image in which the main subject part (the face of the person in this example) is focused.

Figure 7A:
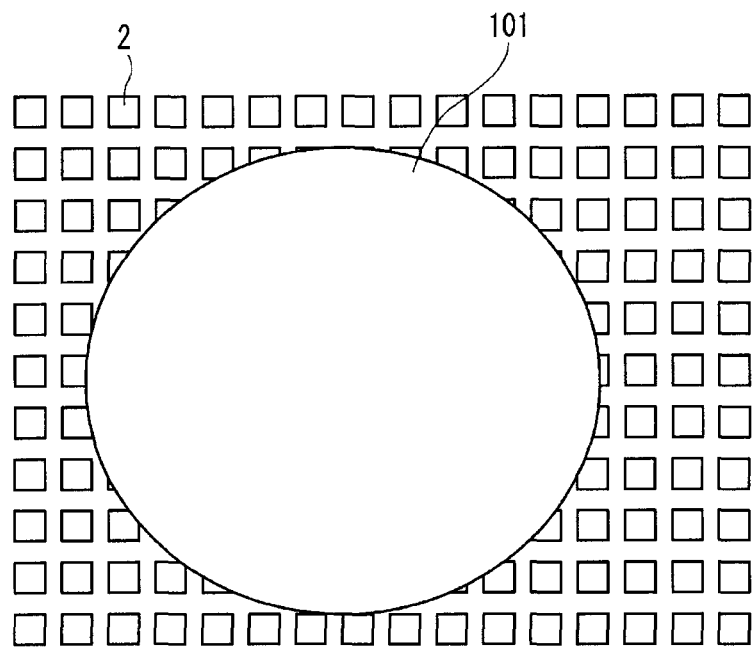
FIG. 7A is an enlarged view illustrating a state in which the dust illustrated in FIG. 6 is attached and FIG. 7B is an enlarged view illustrating a dust image.
Figure 7B:
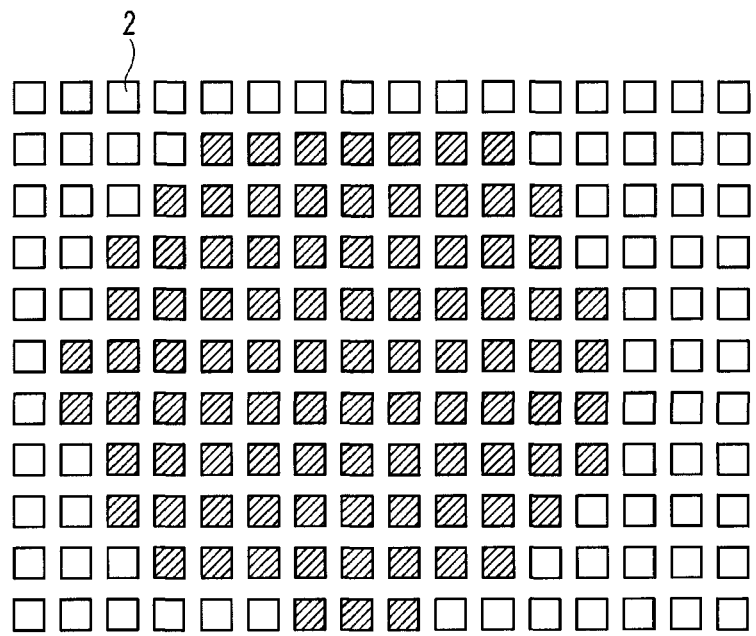

However, as illustrated in FIG. 7A, when the dust 101 is attached on the phase difference detection pixel 2 of a required part (an AF region that allows the focus to be adjusted) in the phase difference pixel available region 11b, the sensitivity of the phase difference detection pixel (illustrated by hatching) in a dust presence region on which the dust 101 is attached is reduced to be lower than sensitivity of the phase difference detection pixel in a dust absence region by the reduced amount of transmitted light of the dust 101 as illustrated in FIG. 7B, and as a result, a slight dark image is achieved.

As a result, when a phase difference AF control is performed in the dust presence region, the AF precision may deteriorate. However, when the phase difference AF control is performed in the dust absence region, a so-called focus blurring image in which the main subject is not focused may be captured.

Therefore, in an exemplary embodiment described below, a phase difference amount di in the dust presence region (FIG. 5) is calculated and the reliability of the phase difference amount is determined and when the reliability is high, the phase difference AF control is performed by the phase difference amount di calculated in the dust presence region.

When the reliability of the phase difference amount di in the dust presence region is low, a phase difference amount dj of the dust absence region is calculated and the reliability of the phase difference amount dj is determined and when the reliability is high, the phase difference AF control is performed by the phase difference amount dj calculated in the dust absence region. When the reliability of the phase difference amount dj in the dust absence region is low, the contrast AF control is performed.

Figure 8:
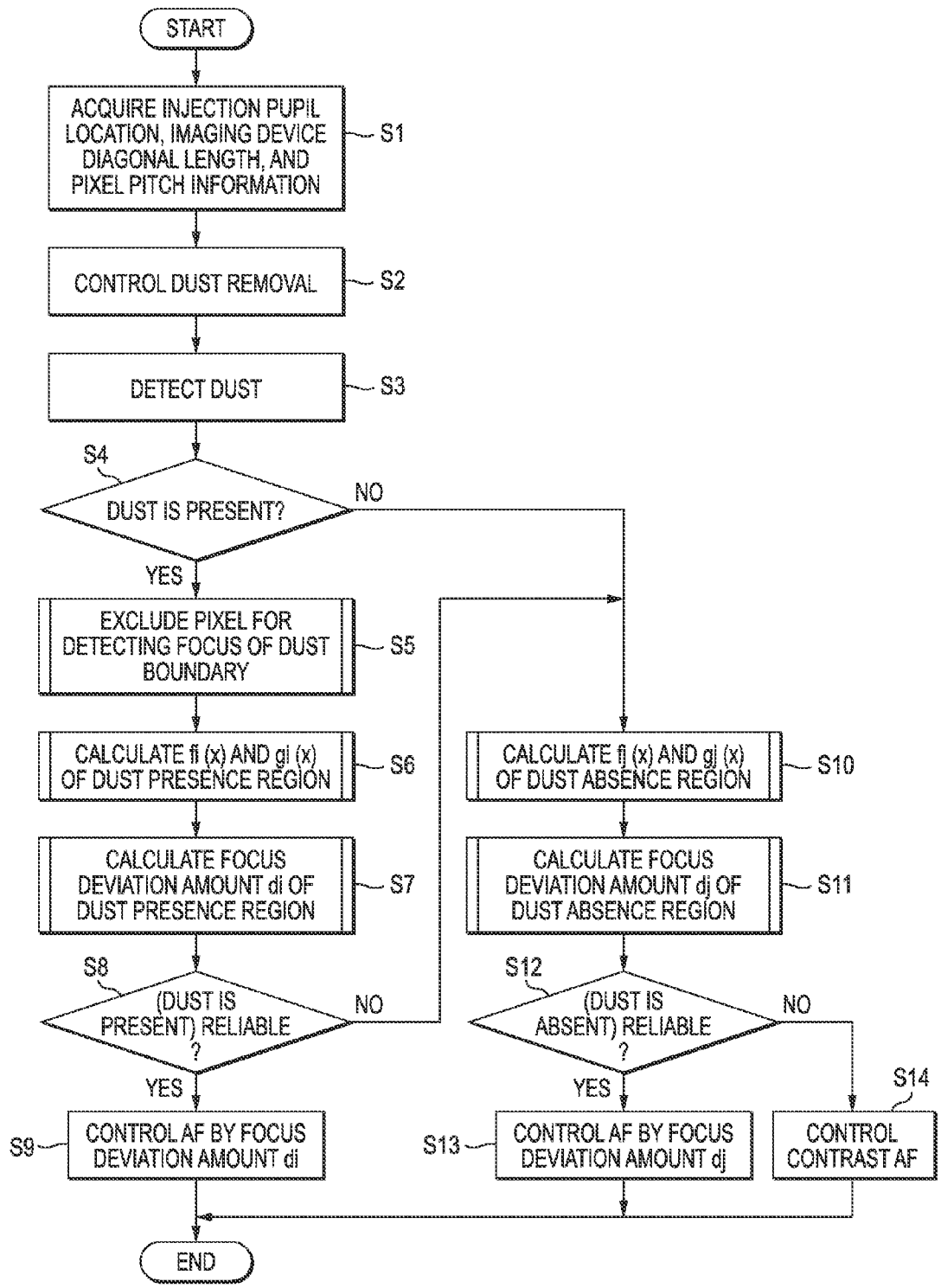
FIG. 8 is a flowchart illustrating an entire processing sequence of an autofocus control method according to an exemplary embodiment of the present invention.

FIG. 8 is a flowchart illustrating an AF control processing sequence according to an exemplary embodiment of the present invention and the AF control processing is executed by using each component controlled, to which the system controller 21 of FIG. 1 is connected through the bus 30. First, in step S1, information of the mounted lens unit 13 is acquired and information of the solid-state imaging device 11 is acquired. This is because, when the phase difference amount is calculated, an injection pupil location of the photographing lens 17 or an imaging device diagonal length, a pixel pitch, and the like are used. When the lens unit 13 is not replaceable but fixed, the information is a fixed value.

In the next step S2, a dust removal control is performed, which gives an instruction to the driver 51 and applies minute vibration to the optical low pass filter 12. In addition, in step S3, it is detected whether dust that remains on the surface of the optical low pass filter 12 is present. That is, since incident light that transmits the optical low pass filter 12 is projected onto the light receiving surface of the solid-state imaging device 11, an image of the dust is captured by the solid-state imaging device 11 to detect presence or absence of the dust image.

Detection of the presence or absence of the dust, that is, detection of the presence or absence of the dust image may be achieved by analyzing the image when the imaging apparatus 10 is actuated, and as a result, the solid-state imaging device 11 outputs captured image data (through image data) in a moving image state. For example, in this case, the presence or absence of the dust image may be detected by considering whether a region of which sensitivity is lower than surrounding sensitivity is present by outputting the through image data in which a shutter speed is decreased and an exposure amount is increased. In this case, the presence or absence of the dust image may be detected more precisely by displaying a message, "Turn the lens to face a white wall or paper" or "Photograph the air," to a user.

Alternatively, an image photographed by a general photographing operation is analyzed at every photographing and when the images are accumulated in tens or hundreds of sheets, the presence or absence of the dust may be detected precisely. A location of the detected dust is stored, for example, in a memory and the following control may be performed by using the stored location.

Figure 9:
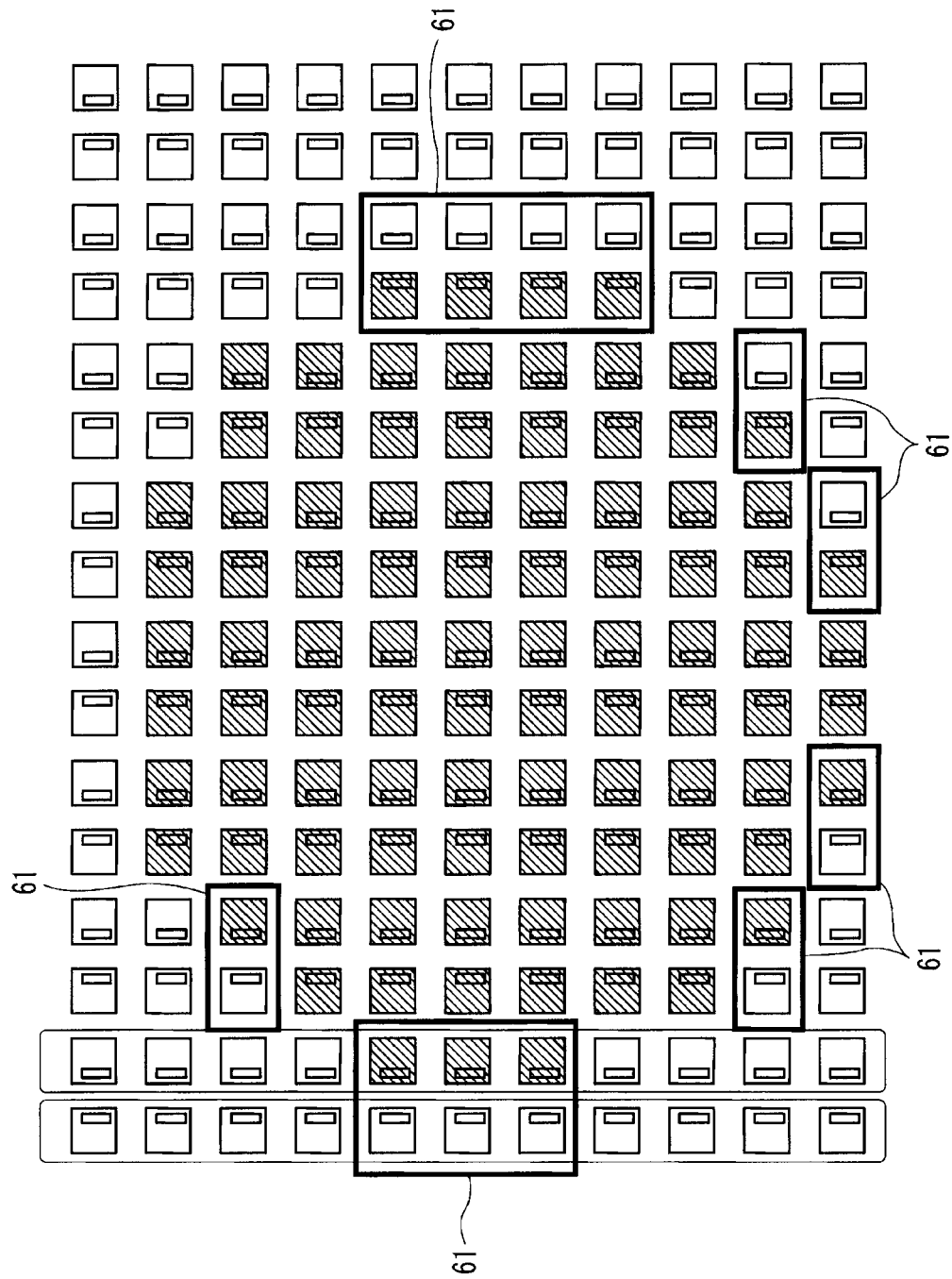
FIG. 9 is a view illustrating a state of a dust boundary when the dust is attached on the solid-state imaging device illustrated in FIG. 4.

Next, in step S4, it is determined whether the dust is present or not in the AF region and when the dust is present, the process proceeds to step S5. In step S5, an exclusion processing of the phase difference detection pixel (focus detection pixel) on a dust boundary is performed. In the case of the phase difference detection pixel of the exemplary embodiment, two pixels adjacent in the horizontal direction are set as a pair of pixels as described in FIGS. 2 to 5 and for example, as illustrated in FIG. 9, a pair of pixels (surrounded by a rectangular frame 61) is present, in which one of the pair of pixels overlaps with the dust region and the other pixel is out of the dust region on the dust boundary.

As described in FIG. 5, since the phase difference information is obtained by acquiring a difference between a detection signal of a first phase difference detection pixel and a detection signal of a second phase difference detection pixel that constitute the pair of pixels, when only one pixel of the pair of pixels is covered with the dust, the difference is influenced by the presence or absence of the dust rather than the phase difference information, and as a result, phase difference information with high precision may not be obtained. As a result, it is necessary to exclude the pair of pixels (phase difference detection pixels) surrounded by the rectangular frame 61 of FIG. 9 on the dust boundary.

Figure 10:
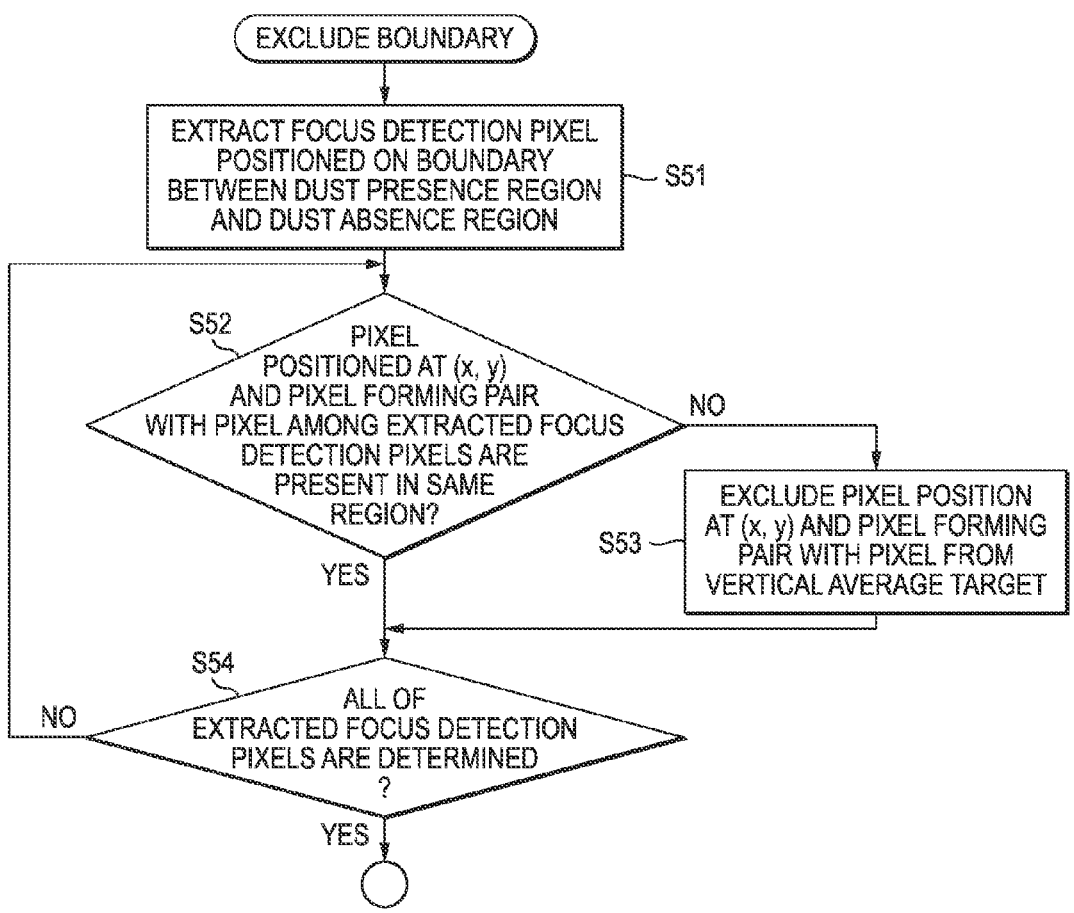
FIG. 10 is a flowchart illustrating a detailed processing sequence of the processing of step S5 of excluding a phase difference detection pixel illustrated in FIG. 8.

FIG. 10 is a flowchart illustrating a detailed sequence of the processing (step S5 of FIG. 8) of excluding the phase difference detection pixels on the dust boundary. First, a phase difference detection pixel is extracted, which is positioned on a boundary between the dust presence region and the dust absence region (step S51). In the next step S52, it is determined whether two adjacent phase difference detection pixels which constitute the pair of pixels are present in the same region or not (whether both the pixels are present in the dust presence region or both the pixels are present in the dust absence region).

According to a result of the judgment of step S52, the pair of the phase difference detection pixels that are not present in the same region are excluded in the next step S53 and excluded from a target of the adding and averaging process described in FIG. 5 and thereafter, the process proceeds to step S54. According to the result of the judgment of step S52, when the phase difference pixels that form the pair are present in the same region, the process proceeds to step S54.

In step S54, it is determined whether the judgment processing of step S52 is performed in all the phase difference detection pixels extracted in step S51 or not and when a result of the judgment is negative (No), the process returns to step S52 and when the result of the judgment is positive (Yes), the processing of FIG. 10 ends and the process proceeds to step S6 of FIG. 8.

In step S6 of FIG. 8, signal amounts fi(x) and gi(x) at the sampling points (locations of the light shielding film openings 2a and 2b) of the f(x) and g(x) described in FIG. 5 are calculated in the dust presence region (hatched region of FIG. 7B) of the AF region and the focus deviation amount di in the dust presence region is calculated in the next step S7.

As illustrated in FIG. 5, only signals of discrete black point locations (sampling points) of f(x) and g(x) at a lower end on a graph may be detected from the detection signal of the phase difference detection pixel 2. The signal detection locations (the location of the light shielding film opening 2a and the location of the light shielding film opening 2b) by the pair of pixels slightly deviate from each other, but the signal detection locations may be regarded as the same horizontal location x. A graph of consecutive f(x) and g(x) is obtained from the discrete detection locations and location deviation between both f(x) and g(x), for example, peak locations is calculated as the focus deviation amount di.

After the focus deviation amount di in the dust presence region is calculated, the process proceeds to step S8 and the reliability of the focus deviation amount di calculated in the dust presence region is determined as described below. When the reliability is high, the process proceeds to step S9, the phase difference AF control is executed based on the focus deviation amount di, and the processing ends.

According to the judgment result of step S4, when it is determined that there is no dust, the process proceeds to step S10. Further, according to the judgment result of step S8, when the reliability is low, the process proceeds to step S10.

In step S10, fj(x) and gj(x) of the sampling points are calculated in the dust absence region (white region of FIG. 7B) in the AF region as described in step S6 and in the next step S11, the focus deviation amount dj in the dust absence region is calculated.

In the next step S12, the reliability of the focus deviation amount dj calculated in the dust absence region is determined as described below and when the reliability is high, the process proceeds to step S13 and the phase difference AF control is executed with the focus deviation amount dj and the processing ends.

According to a result of the judgment in step S12, when the reliability is low, the process proceeds to step S14 and the contrast AF control is executed as described below and thereafter, the processing ends.

Figure 11:
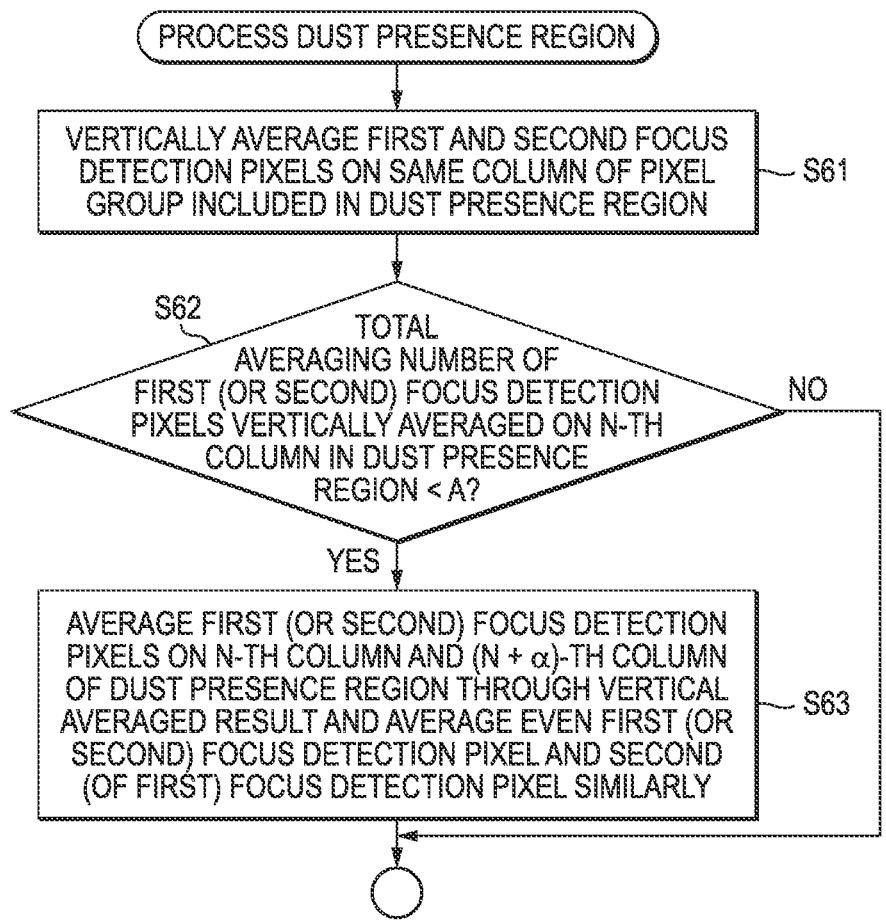
FIG. 11 is a flowchart illustrating a detailed processing sequence of step S6 of acquiring a detection signal of the phase difference detection pixel in a dust presence region of FIG. 8.

FIG. 11 is a flowchart illustrating a detailed processing sequence of step S6 of FIG. 8. First, in step S61, detection signals of first and second phase difference detection pixels constituting a plurality of pairs of pixels on the same column of a pixel group included in the dust presence region are added in the vertical direction to calculate an average value thereof.

In the next step S62, it is determined whether a total addition and averaging number of the first (or second) phase difference detection pixels which are vertically added and averaged on an n-th column of the pair pixel columns in the dust presence region is less than a predetermined threshold value A. When the total addition and averaging number is equal to or more than A, the pixel addition number is sufficient, and as result, it is determined that the AF precision may be obtained and the processing of FIG. 8 ends.

According to a result of the judgment in step S62, when the total addition and averaging number is less than A, the pixel addition number is small and thus, there is a high probability that the AF precision will not be obtained, and as a result, processing of next step S63 is performed and the processing of FIG. 8 ends.

In step S63, vertical addition and average values of detection signals of first phase difference detection pixels on an n+1-th column (or an n−1-th column) adjacent to the n-th column of the pair pixel columns are added and vertical addition and average values of detection signals of second phase difference detection pixels are added. As a result, the signal amounts of the locations marked with the black points of f(x) and g(x) illustrated in FIG. 5 may be obtained.

As such, in the exemplary embodiment, when the pixel addition number is small, it is determined that accuracy of the vertical addition and average value is low, and as a result, horizontal resolution is abandoned and horizontal pixel addition is performed to thereby improve the AF precision.

Figure 12:
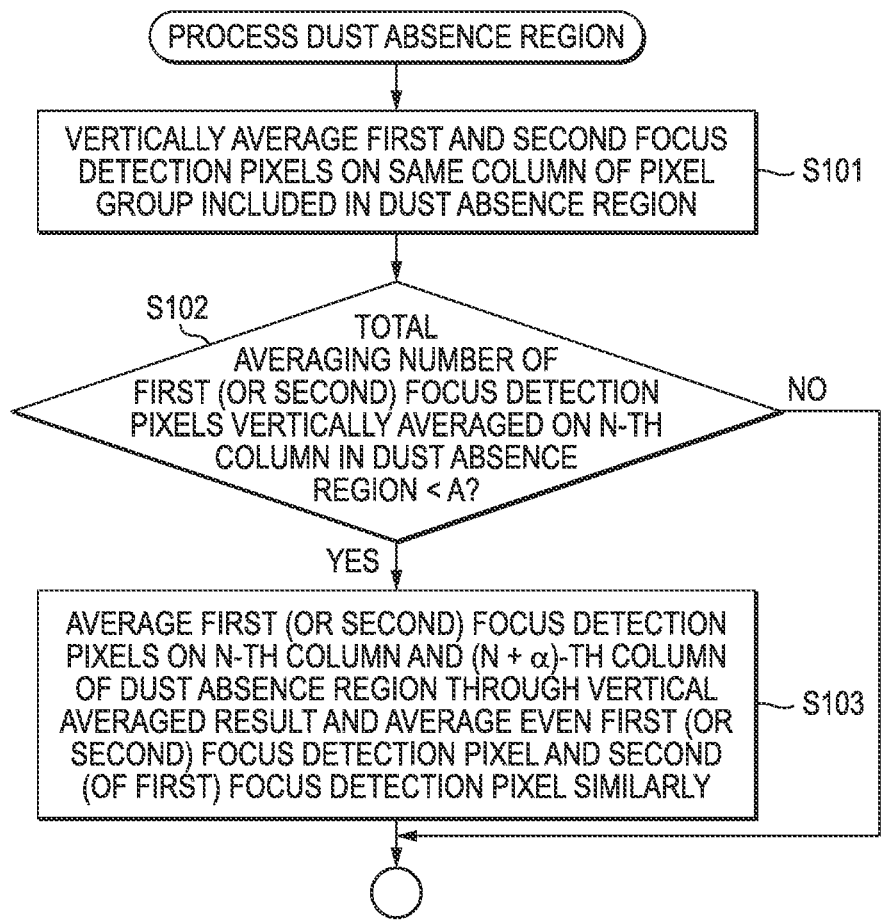
FIG. 12 is a flowchart illustrating a detailed processing sequence of step S10 of acquiring the detection signal of the phase difference detection pixel in a dust absence region of FIG. 8.

FIG. 12 is a flowchart illustrating a detailed processing sequence of step S10 of FIG. 8. Processing contents of steps S101, S102, and S103 are the same as those of steps S61, S62, and S63 of FIG. 11, respectively and both figures are different from each other only in that FIG. 11 illustrates processing in the dust presence region, while FIG. 12 illustrates processing in the dust absence region. Therefore, a duplicated description will be omitted.

Figure 13:
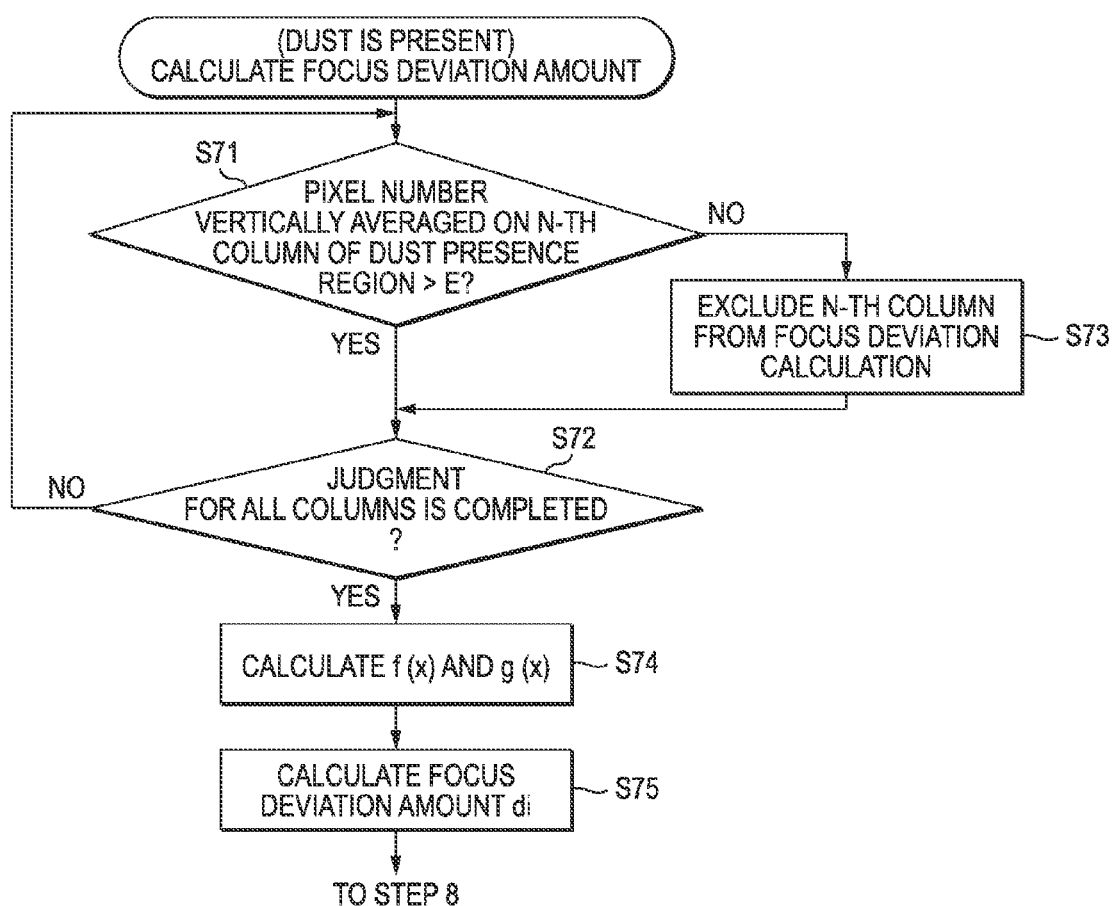
FIG. 13 is a flowchart illustrating a detailed processing sequence of step S7 of calculating a focus deviation amount di of FIG. 8.

FIG. 13 is a flowchart illustrating a detailed processing sequence of step S7 of FIG. 8. First, in step S71, it is determined whether a vertically added and averaged pixel number is larger than a predetermined threshold value E on the n-th column of the pair pixel column in the dust presence region or not.

According to a result of the judgment, when the addition pixel number ≥E, the process proceeds to the next step S72. According to a result of the judgment in step S71, when the addition pixel number <E, the n-th column is excluded from a focus deviation calculation target in step S73 and the process proceeds to step S72.

In step S72, it is determined whether the judgment of step S71 is performed on all columns of the dust presence region or not and when there is a column which is still not determined, the process proceeds to step S71. When the judgment for all of the columns ends, the process proceeds to step S74 to calculate f(x) and g(x) illustrated in FIG. 5 and in the next step S75, a phase difference amount di between a peak location of f(x) and a peak location of g(x) is calculated as the focus deviation amount di of the dust presence region and the process proceeds to step S8 of FIG. 8.

Figure 14:
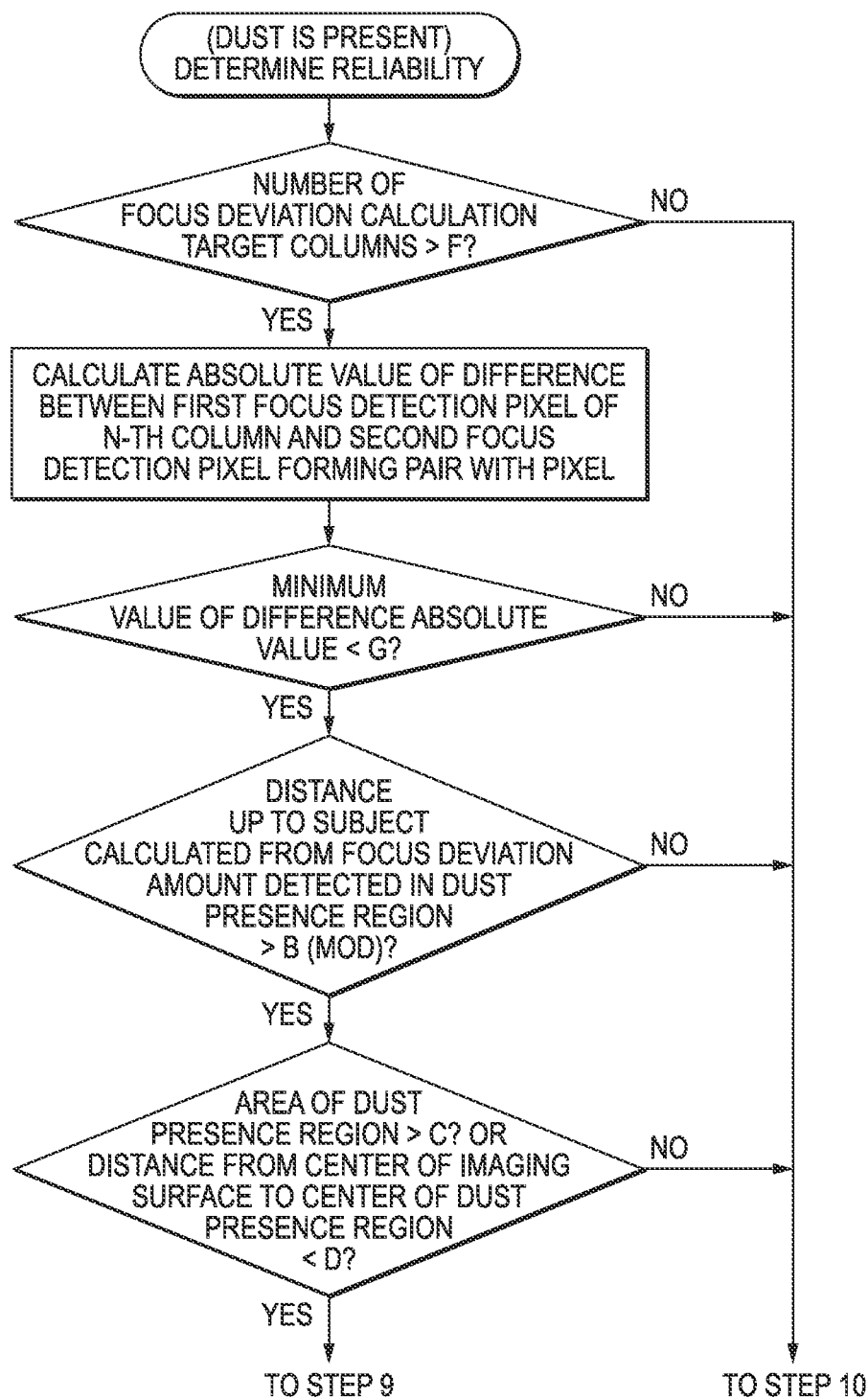
FIG. 14 is a flowchart illustrating a detailed processing sequence of step S8 of determining the reliability of the focus deviation amount di calculated in the dust presence region of FIG. 8.

FIG. 14 is a flowchart illustrating a detailed processing sequence of step S8 (FIG. 8) of determining of the reliability. First, in step S81, it is determined whether the number of pair pixel columns which is a calculation target of a focus deviation amount is larger than a predetermined threshold number F or not. When the number of pair pixel columns to be calculated <F, the number may not obtain the precision, and as a result, it is determined that the reliability is low and the process proceeds to step S10 of FIG. 8.

According to a result of the judgment in step S81, when the number of pair pixel columns to be calculated ≥F, the process proceeds to step S82 to calculate an absolute value of the difference between the signal amount of the first phase difference detection pixel and the signal amount of the second phase difference detection pixel on the n-th column of the pair pixel columns.

In the next step S83, it is determined whether a minimum value of the absolute value of the difference is less than a predetermined threshold value G. When the minimum value of the absolute value of the difference is ≥G, that is, when the difference is too large, it is determined that the difference is caused by not a time difference (phase difference amount) but another cause, and as a result, it is determined that the reliability of the focus deviation amount di is low and the process proceeds to step S10.

According to a result of the judgment in step S83, when the absolute value of the difference <G, the process proceeds to next step S84. In step S84, the focus deviation amount di calculated in the dust presence region is converted into a distance up to a subject and it is determined whether the distance is more than a predetermined threshold value B (for example, a shortest photographing distance MOD), that is, whether the distance up to the subject >B.

When the judgment result is negative, that is, the distance up to the subject ≤B, it is difficult to determine that the distance is smaller than the shortest photographing distance, and as a result, it is determined that the reliability of the focus deviation amount di is low and the process proceeds to step S10.

According to a result of judgment in step S84, when the distance up to the subject >B, the process proceeds to next step S85 to judge an area or a location occupied by the dust and it is determined whether a possibility that the main subject will be present in the dust presence region is high. That is, it is determined whether the area of the dust presence region is larger than the predetermined threshold value C or it is determined whether a distance up to the center of the dust presence region from the center of the imaging surface (light receiving surface) is smaller, that is, closer than the predetermined threshold value D.

When the judgment result is negative, it is determined that the reliability of the focus deviation amount di is low and thus, the process proceeds to step S10 and when judgment result is positive, it is determined that the reliability of the focus deviation amount di is high, so that the process proceeds to step S9 and the phase difference AF control using the focus deviation amount di is executed.

Figure 15:
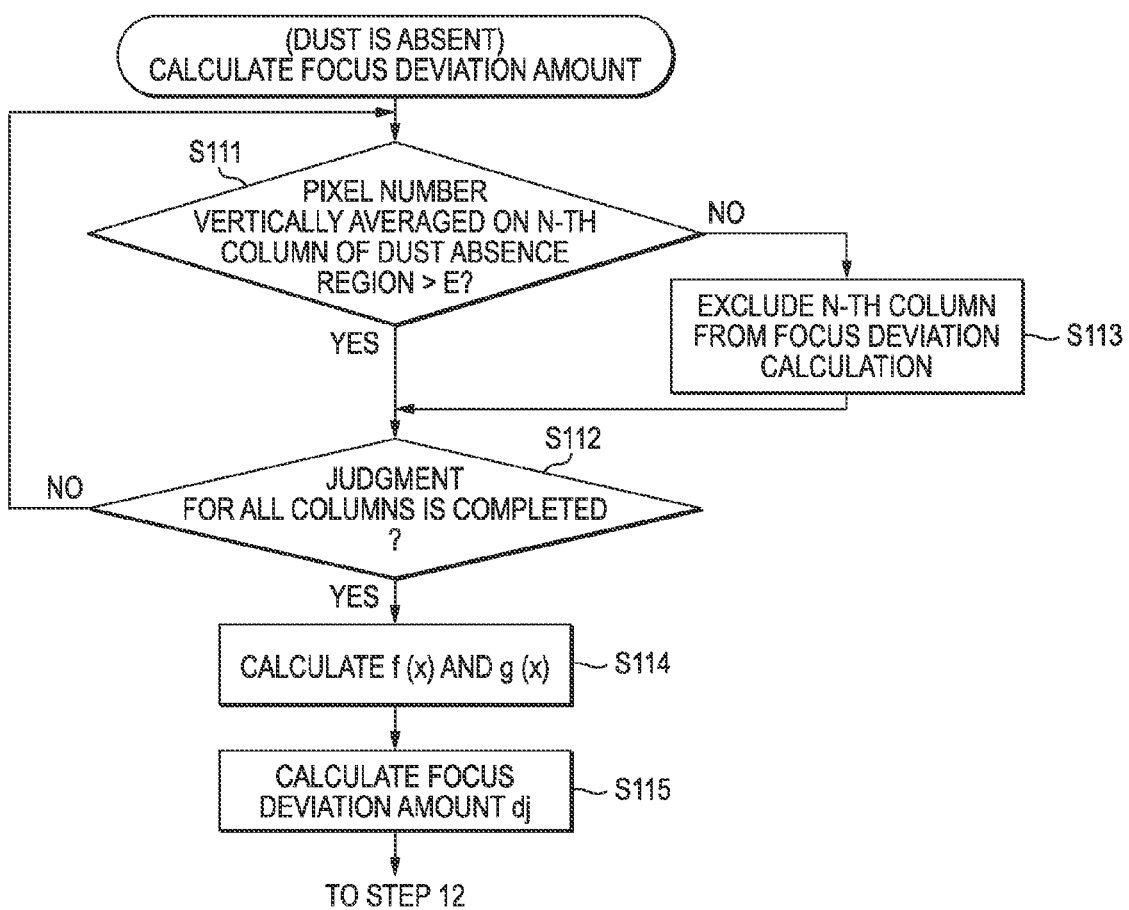
FIG. 15 is a flowchart illustrating a detailed processing sequence of step S11 of calculating a focus deviation amount dj of FIG. 8.

FIG. 15 is a flowchart illustrating a detailed processing sequence of step S11 of FIG. 8. Processing contents of steps S111, S112, S113, S114, and S115 are the same as the processing contents of steps S71, S72, S73, S74, and S75 described in FIG. 13, and the processing contents in FIG. 13 and the processing contents of FIG. 15 are different from each other in that FIG. 15 illustrates processing of the dust absence region. In step S115, the focus deviation amount dj is calculated and the process proceeds to step S12.

Figure 16:
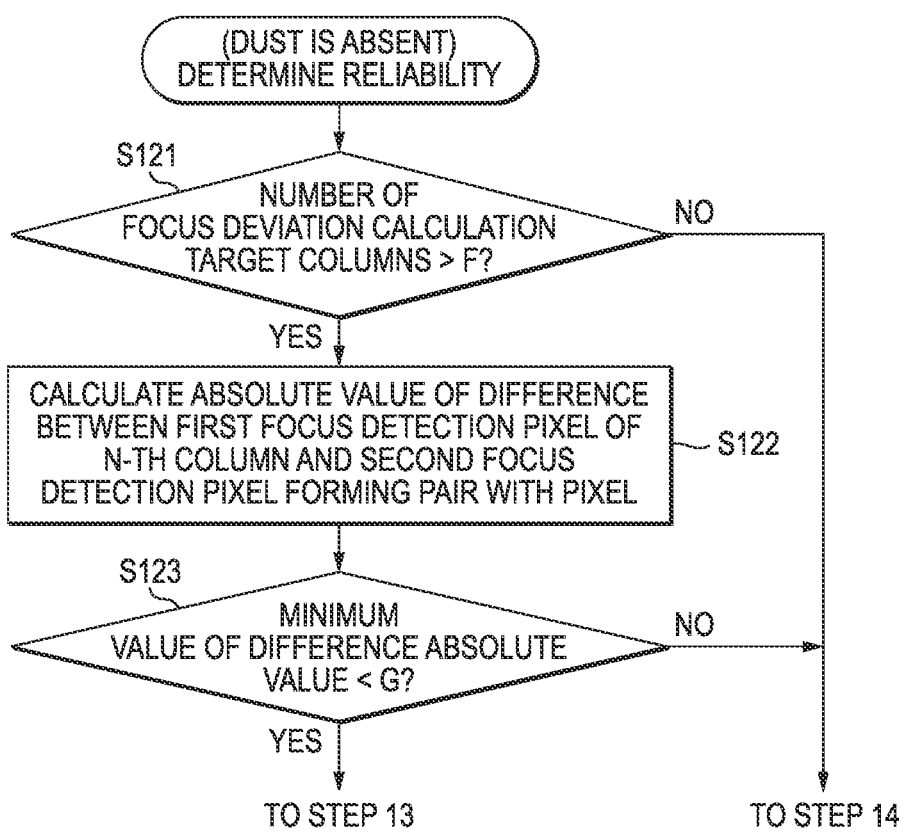
FIG. 16 is a flowchart illustrating a detailed processing sequence of step S12 of determining the reliability of the focus deviation amount dj calculated in the dust absence region of FIG. 8.

FIG. 16 is a flowchart illustrating a detailed processing sequence of step S12 of FIG. 8 and illustrates a processing sequence of determining the reliability of the focus deviation amount dj in the dust absence region calculated in step S11. In the flowchart, three steps of S121, S122, and S123 are provided. In three steps, the same processings as steps S81, S82, and S83 of FIG. 14 are performed, respectively. That is, when the number of columns for calculating the focus deviation amount is more than F in step S121, the process proceeds to step S122 and when the number of columns is less than F, the reliability is low, and as a result, the process proceeds to step S14.

In step S122, the absolute value of the difference is calculated like step S82 and in step S123, when the minimum value of the absolute value of the difference <G, it is determined that the reliability of the focus deviation amount dj is high and the process proceeds to step S13 and when the minimum value of the absolute value of the difference ≥G, it is determined that the reliability of the focus deviation amount dj is low and the process proceeds to step S14.

In step S14, the contrast AF control is performed. When the contrast AF control is performed, for example, a photographed image is segmented into a plurality of regions to evaluate a contrast value in each region. In this case, a region including dust is set as a dust presence region. After the dust presence region is excluded from a target of the contrast AF or based on the same judgment criterion (for example, when the distance up to the subject is MODE, it is determined as NG) as in calculating the focus deviation amount, reliability of the contrast value calculated in the dust presence region is determined.

Figure 17:
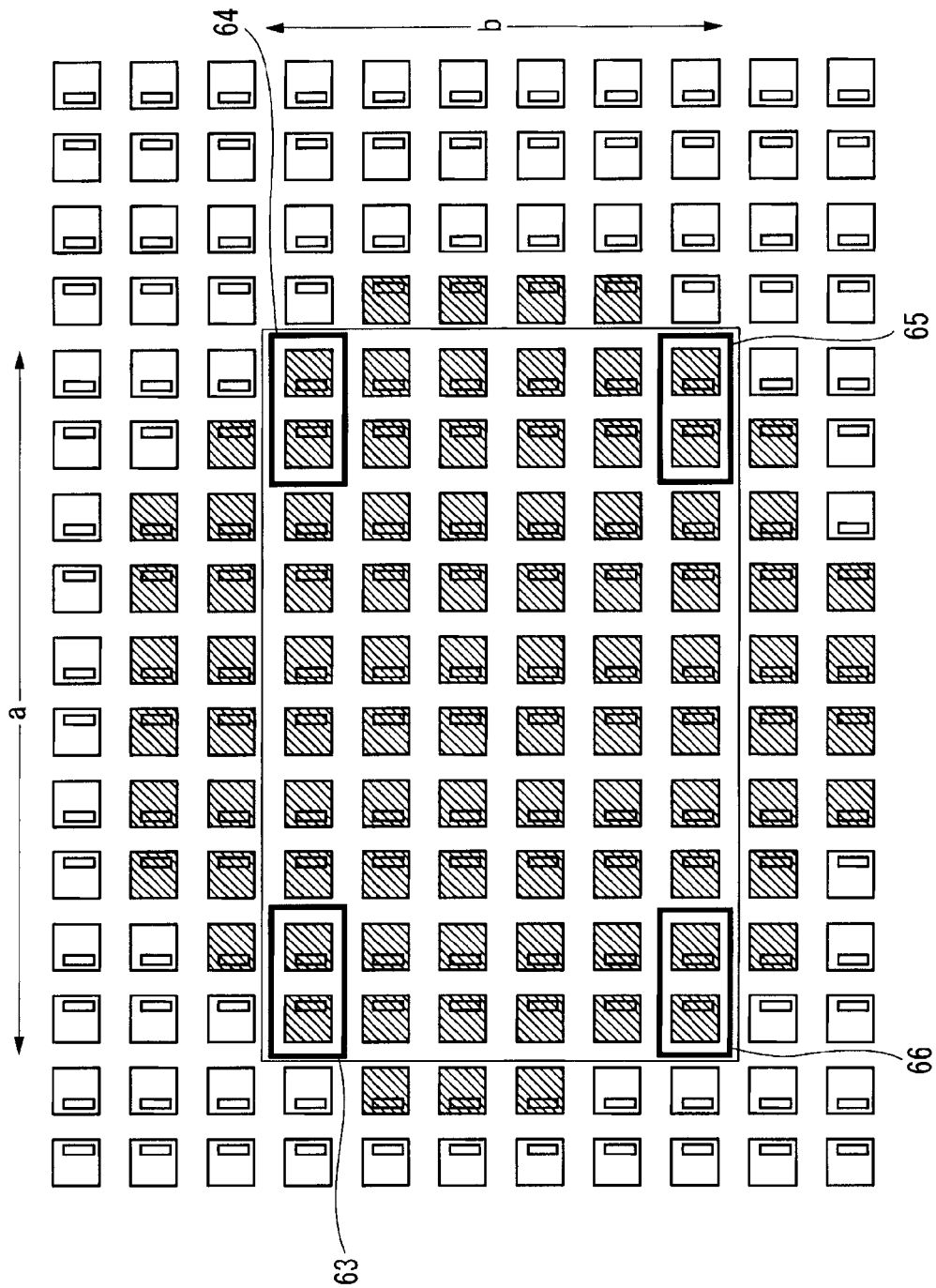
FIG. 17 is a description diagram of step S14 of contrast AF control of FIG. 8.

The contrast AF is separately performed by only the dust presence region and the contrast value may be compared with a contrast value of another region. In this case, a region is designed so as to obtain a maximum area in a rectangular shape, in the dust presence region. For example, as illustrated in FIG. 17, pair pixels 63, 64, 65, and 66 at four edges to obtain the maximum rectangular area are determined. Two pair pixels are selected to be both included in the dust presence region. The reason is that the detection signals of the first phase difference detection pixel and the second phase difference detection pixel are mixed in order to remedy a sensitivity deficiency, and the like.

Figure 18:
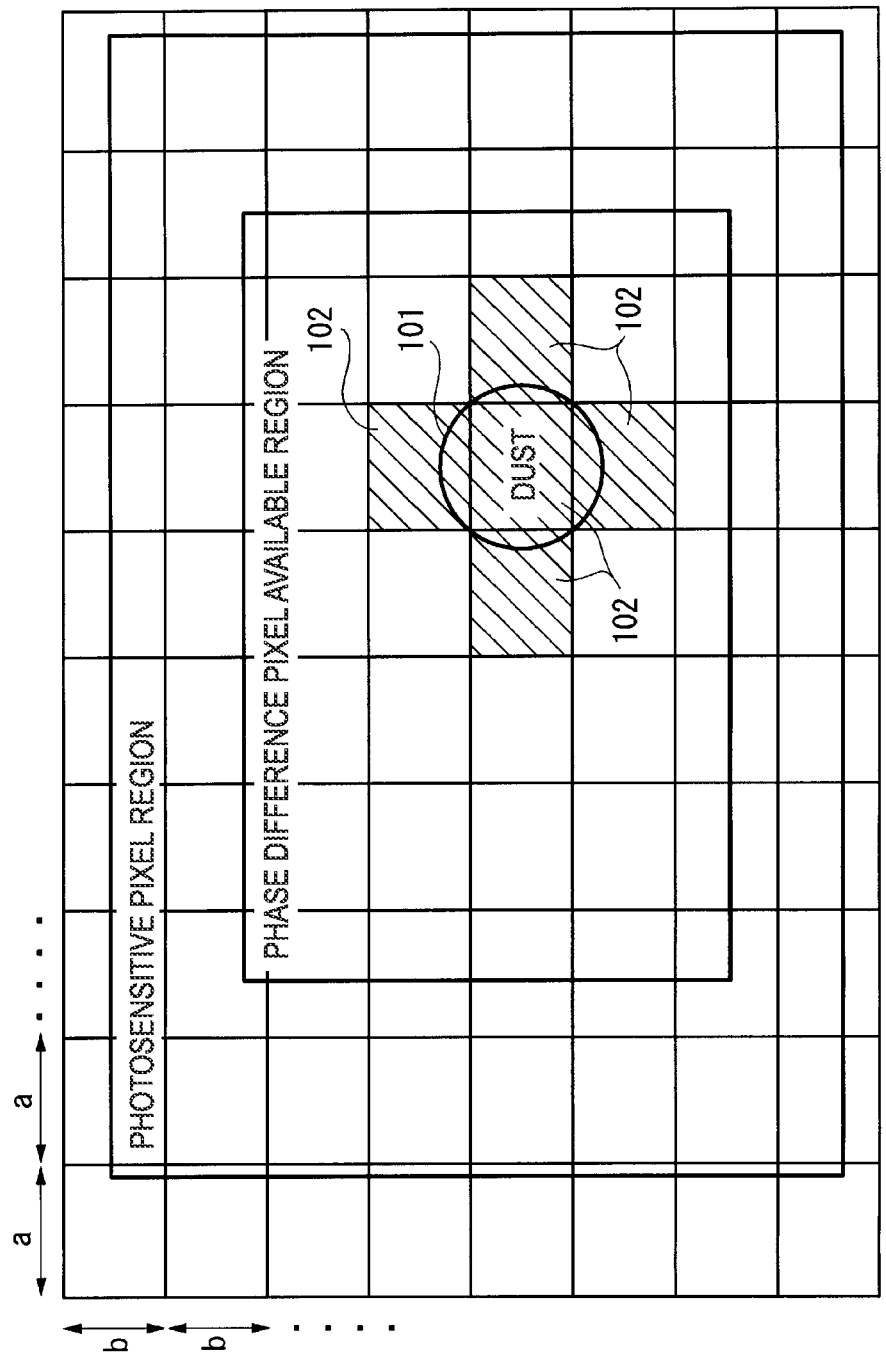
FIG. 18 is a view illustrating region segmentation when step S14 of contrast AF control of FIG. 8 is performed.

The imaging region is segmented into a plurality of regions based on the sizes of the pair pixels 63, 64, 65, and 66. That is, when a distance (a rectangular lateral size) between the pair pixel 63 and the pair pixel 64 is set as a and a distance (a rectangular longitudinal size) between the pair pixel 64 and the pair pixel 65 is set as b, a rectangular region having the lateral size of a and the vertical size of b is set as a unit region. In addition, as illustrated in FIG. 18, the photosensitive pixel region is segmented into a plurality of unit regions. A region including even a part of the dust 101 is set as a dust presence region 102. A circumferential unit region is set to be unavailable, which pokes out to an outer unavailable pixel region of the photosensitive pixel region from surrounding unit regions.

The contrast AF is performed by segmenting the photosensitive pixel region into the plurality of regions to perform contrast AF control having high precision. When the contrast AF is performed, the contrast value of the dust presence region is first calculated and the contrast AF control is performed, and as a result, a subject image in which a main subject is focused may be captured even when the main subject image overlaps with the dust presence region.

When the reliability of the contrast value of the dust presence region is low, the contrast AF may be performed in the dust absence region other than the dust presence region or the contrast AF may be first performed in the dust absence region. Further, when a plurality of dust is present in the imaging region, a minimize size of dust may be determined as the size of the unit region.

According to the aforementioned exemplary embodiments, the phase difference AF method using the phase difference detection pixel is performed over the contrast AF method and further, even when the phase difference AF method is performed, the phase difference AF method in the dust presence region is preferred even though the dust overlaps with the AF region, and as a result, it is possible to capture the image in which the main subject is focused. Further, when the AF precision may not be obtained by the phase difference AF method, the contrast AF method is performed at last, and as a result, it is possible to adjust a focus even in any scene.

It is an imaging apparatus and an autofocus control method of the aforementioned exemplary embodiments, comprising: a solid-state imaging device which is provided, on a light receiving surface, with a plurality of sets of first and second phase difference detection pixels each set of the first and second phase difference detection pixels are adjacent to each other and pupil-divided; a dust presence or absence determination unit that determines whether a dust image is present or not in an image captured in an AF region of the light receiving surface; a focus deviation amount calculating unit that calculates a deviation amount between a detection signal of the first phase difference detection pixel and a detection signal of the second phase difference detection pixel overlapping with the dust image when the dust image is included in the AF region; a deviation amount reliability determination unit that judges reliability of the deviation amount; and a control unit that performs an autofocus control by a phase difference AF method using the deviation amount when the reliability of the deviation amount is high and performs an autofocus control by a method other than the phase difference AF method using the deviation amount when the reliability is low.

And, in the imaging apparatus and the autofocus control method of the aforementioned exemplary embodiments, when the reliability is low, a deviation amount of a dust absence region which does not overlap with the dust image is calculated by the focus deviation amount calculating unit in the AF region and reliability of the deviation amount of the dust absence region is determined and when the reliability is high, the autofocus control is performed by the phase difference AF method by using the deviation amount of the dust absence region and when the reliability is low, the autofocus control is performed by a contrast AF method.

And, in the imaging apparatus and the autofocus control method of the aforementioned exemplary embodiments, the contrast AF method is performed in each of a region where the dust image is present and a region where the dust image is not present on the light receiving surface.

And, in the imaging apparatus and the autofocus control method of the aforementioned exemplary embodiments, a set of first and second phase difference detection pixels which is positioned on a boundary of the region overlapping with the dust image in the AF region and in which one of the first and second phase difference detection pixels is included in the region which does not overlap with the dust image is excluded from the calculation target of the deviation amount of claim 1.

And, in the imaging apparatus and the autofocus control method of the aforementioned exemplary embodiments, as the detection signals of the first and second phase difference detection pixels used when calculating the deviation amount, a signal calculated by adding and averaging detection signals of pixel columns constituted by the plurality of phase difference detection pixels that are arranged on the light receiving surface in a vertical direction is used.

And, in the imaging apparatus and the autofocus control method of the aforementioned exemplary embodiments, when the added and averaged pixel number is less than a first predetermined threshold value, a signal acquired by adding and averaging the signals of the pixel column and the signals of a pixel column adjacent to the pixel column is used as the detection signals to calculate the deviation amount.

And, in the imaging apparatus and the autofocus control method of the aforementioned exemplary embodiments, when the added number in the addition and the averaging is less than a second predetermined threshold value, the deviation amount is calculated excluding the signals of the pixel column.

And, in the imaging apparatus and the autofocus control method of the aforementioned exemplary embodiments, when the number of the pixel columns used when calculating the deviation amount is less than a third predetermined value, it is determined that the reliability is low.

And, in the imaging apparatus and the autofocus control method of the aforementioned exemplary embodiments, an absolute value of a difference between the signal acquired from the detection signal of the first phase difference detection pixel and the signal acquired from the detection signal of the second phase difference detection pixel used when calculating the deviation amount is set as an evaluation value of the reliability.

And, in the imaging apparatus and the autofocus control method of the aforementioned exemplary embodiments, it is determined that the reliability is high as the evaluation value is low and when a minimum value of the absolute value is larger than a fourth predetermined threshold value, it is determined that the reliability is low.

And, in the imaging apparatus and the autofocus control method of the aforementioned exemplary embodiments, the deviation amount is converted into a distance up to a subject and when the distance up to the subject is smaller than a fifth predetermined threshold value, it is determined that the reliability is low.

And, in the imaging apparatus and the autofocus control method of the aforementioned exemplary embodiments, when an area of the dust image is larger than a sixth predetermined threshold value or a distance between the center of the dust image and the center of the light receiving surface is smaller than a seventh predetermined threshold value, it is determined that the reliability is low.

According to the aforementioned exemplary embodiments, even if the dust image is positioned on the light receiving surface of the solid-state imaging device and at the location overlapping with the main subject image, the image in which the main subject is focused may be captured.

INDUSTRIAL APPLICABILITY

Since the imaging apparatus according to the present invention can capture an image in which the main subject image in the AF region is focused even if the dust is attached on the AF region, the imaging apparatus can be usefully applied to an imaging apparatus such as a digital camera or a camera mounted cellular phone.

Although the present invention has been described in detail with reference to a specific exemplary embodiment, it is apparent to those skilled in the art that various changes or modifications can be made without departing from the spirit and the scope of the present invention.

This application is based on Japanese Patent Application No. 2011-076344 filed on Mar. 30, 2011 and the content thereof are incorporated herein by reference.

REFERENCE SIGNS LIST

2 Phase difference detection pixel
2a Light shielding film opening of first phase difference detection pixel
2b Light shielding film opening of second phase difference detection pixel
10 Imaging apparatus
11 Solid-state imaging device
11a Photosensitive pixel region (light receiving region)
11b Phase difference detection pixel available region
20 Signal processing LSI
21 System controller
101 Dust

The invention claimed is:

1. An imaging apparatus, comprising:
a solid-state imaging device which is provided, on a light receiving surface, with a plurality of sets of first and second phase difference detection pixels each set of the first and second phase difference detection pixels are adjacent to each other and pupil-divided;
a dust presence or absence determination unit that determines whether a dust image is present or not in an image captured in an AF region of the light receiving surface;
a focus deviation amount calculating unit that calculates a deviation amount between a detection signal of the first phase difference detection pixel and a detection signal of the second phase difference detection pixel overlapping with the dust image when the dust image is included in the AF region;
a deviation amount reliability determination unit that judges reliability of the deviation amount; and a control unit that performs an autofocus control by a phase difference AF method using the deviation amount when the reliability of the deviation amount is high and performs an autofocus control by a method other than the phase difference AF method using the deviation amount when the reliability is low,
wherein a set of first and second phase difference detection pixels which is positioned on a boundary of the region overlapping with the dust image in the AF region and in which one of the first and second phase difference detection pixels is included in a region which does not overlap with the dust image is excluded from the calculation target of the deviation amount.

2. The imaging apparatus of claim 1, wherein, when the reliability is low, a deviation amount of a dust absence region which does not overlap with the dust image is calculated by the focus deviation amount calculating unit in the AF region and reliability of the deviation amount of the dust absence region is determined and when the reliability is high, the autofocus control is performed by the phase difference AF method by using the deviation amount of the dust absence region and when the reliability is low, the autofocus control is performed by a contrast AF method.

3. The imaging apparatus of claim 2, wherein the contrast AF method is performed in each of a region where the dust image is present and a region where the dust image is not present on the light receiving surface.

4. The imaging apparatus of claim 1, wherein as the detection signals of the first and second phase difference detection pixels used when calculating the deviation amount, a signal calculated by adding and averaging detection signals of pixel columns constituted by the plurality of phase difference detection pixels that are arranged on the light receiving surface in a vertical direction is used.

5. The imaging apparatus of claim 4, wherein, when the added and averaged pixel number is less than a first predetermined threshold value, a signal acquired by adding and averaging the signals of the pixel column and the signals of a pixel column adjacent to the pixel column is used as the detection signals to calculate the deviation amount.

6. The imaging apparatus of claim 4, wherein, when the added number in the addition and the averaging is less than a second predetermined threshold value, the deviation amount is calculated excluding the signals of the pixel column.

7. The imaging apparatus of claim 4, wherein, when the number of the pixel columns used when calculating the deviation amount is less than a third predetermined value, it is determined that the reliability is low.

8. The imaging apparatus of claim 4, wherein an absolute value of a difference between the signal acquired from the detection signal of the first phase difference detection pixel and the signal acquired from the detection signal of the second phase difference detection pixel used when calculating the deviation amount is set as an evaluation value of the reliability.

9. The imaging apparatus of claim 8, wherein it is determined that the reliability is high as the evaluation value is low and when a minimum value of the absolute value is larger than a fourth predetermined threshold value, it is determined that the reliability is low.

10. The imaging apparatus of claim 1, wherein the deviation amount of claim 1 is converted into a distance up to a subject and when the distance up to the subject is smaller than a fifth predetermined threshold value, it is determined that the reliability of claim 1 is low.

11. The imaging apparatus of claim 1, wherein, when an area of the dust image is larger than a sixth predetermined threshold value or a distance between the center of the dust image and the center of the light receiving surface is smaller than a seventh predetermined threshold value, it is determined that the reliability of claim 1 is low.

12. An autofocus control method of an imaging apparatus mounted with a solid-state imaging device which is provided, on a light receiving surface, with a plurality of sets of first and second phase difference detection pixels each set of the first and second phase difference detection pixels are adjacent to each other and pupil-divided, comprising;

determining whether a dust image is present or not in an image captured in an AF region of the light receiving surface;

calculating a deviation amount between a detection signal of the first phase difference detection pixel and a detection signal of the second phase difference detection pixel overlapping with the dust image when the dust image is included in the AF region; judging reliability of the deviation amount; and performing an autofocus control by a phase difference AF method using the deviation amount when the reliability of the deviation amount is high and performs an autofocus control by a method other than the phase difference AF method using the deviation amount when the reliability is low, wherein a set of first and second phase difference detection pixels which is positioned on a boundary of a region overlapping with the dust image in the AF region and in which one of the first and second phase difference detection pixels is included in a region which does not overlap with the dust image is excluded from the calculation target of the deviation amount.

13. The autofocus control method of the imaging apparatus of claim 12, wherein, when the reliability is low, a deviation amount of a dust absence region which does not overlap with the dust image is calculated by the focus deviation amount calculating unit in the AF region and reliability of the deviation amount of the dust absence region is determined and when the reliability is high, the autofocus control is performed by the phase difference AF method by using the deviation amount of the dust absence region and when the reliability is low, the autofocus control is performed by a contrast AF method.

14. The autofocus control method of the imaging apparatus of claim 13, wherein the contrast AF method is performed in each of a region where the dust image is present and a region where the dust image is not present on the light receiving surface.

15. The autofocus control method of the imaging apparatus of claim 12, wherein as the detection signals of the first and second phase difference detection pixels used when calculating the deviation amount, a signal calculated by adding and averaging detection signals of pixel columns constituted by the plurality of phase difference detection pixels that are arranged on the light receiving surface in a vertical direction is used.

16. The autofocus control method of the imaging apparatus of claim 15, wherein, when the added and averaged pixel number is less than a first predetermined threshold value, a signal acquired by adding and averaging the signals of the pixel column and the signals of a pixel column adjacent to the pixel column is used as the detection signals to calculate the deviation amount.

17. The autofocus control method of the imaging apparatus of claim 15, wherein, when the added number in the addition and the averaging is less than a second predetermined threshold value, the deviation amount is calculated excluding the signals of the pixel column.

18. The autofocus control method of the imaging apparatus of claim 15, wherein, when the number of the pixel columns used when calculating the deviation amount is less than a third predetermined value, it is determined that the reliability is low.

19. The autofocus control method of the imaging apparatus of claim 15, wherein an absolute value of a difference between the signal acquired from the detection signal of the first phase difference detection pixel and the signal acquired from the detection signal of the second phase difference detection pixel used when calculating the deviation amount is set as an evaluation value of the reliability.

20. The autofocus control method of the imaging apparatus of claim 19, wherein it is determined that the reliability is high as the evaluation value is low and when a minimum value of the absolute value is larger than a fourth predetermined threshold value, it is determined that the reliability is low.

21. The autofocus control method of the imaging apparatus of claim 12, wherein the deviation amount of claim 12 is converted into a distance up to a subject and when the distance up to the subject is smaller than a fifth predetermined threshold value, it is determined that the reliability of claim 12 is low.

22. The autofocus control method of the imaging apparatus of claim 12, wherein, when an area of the dust image is larger than a sixth predetermined threshold value or a distance between the center of the dust image and the center of the light receiving surface is smaller than a seventh predetermined threshold value, it is determined that the reliability of claim 12 is low.

* * * * *